US009639902B2

United States Patent
Huehn et al.

(10) Patent No.: US 9,639,902 B2
(45) Date of Patent: May 2, 2017

(54) SYSTEM AND METHOD FOR MANAGING TARGETED SOCIAL COMMUNICATIONS

(71) Applicant: IN THE CHAT COMMUNICATIONS INC., Waterloo (CA)

(72) Inventors: John Thomas Huehn, Kitchener (CA); Omar Zia Khan, Bellevue, WA (US)

(73) Assignee: IN THE CHAT COMMUNICATIONS INC., Waterloo, Ontario (CA)

( * ) Notice: Subject to any disclaimer, the term of this patent is extended or adjusted under 35 U.S.C. 154(b) by 389 days.

(21) Appl. No.: 14/340,919

(22) Filed: Jul. 25, 2014

(65) Prior Publication Data

US 2015/0032675 A1 Jan. 29, 2015

Related U.S. Application Data

(60) Provisional application No. 61/858,385, filed on Jul. 25, 2013.

(51) Int. Cl.
*G06F 15/18* (2006.01)
*G06Q 50/00* (2012.01)
*G06N 99/00* (2010.01)

(52) U.S. Cl.
CPC .......... *G06Q 50/01* (2013.01); *G06N 99/005* (2013.01)

(58) Field of Classification Search
USPC .......................................... 706/12
See application file for complete search history.

(56) References Cited

U.S. PATENT DOCUMENTS

| | | | | |
|---|---|---|---|---|
| 9,167,038 | B2 * | 10/2015 | Esmailzadeh | G06F 3/0689 |
| 9,374,422 | B2 * | 6/2016 | Esmailzadeh | H04L 51/32 |
| 9,542,712 | B2 * | 1/2017 | Gupta | G06Q 50/01 |
| 2010/0257028 | A1 | 10/2010 | Hillerbrand | |
| 2012/0047219 | A1 | 2/2012 | Feng | |
| 2012/0290405 | A1 * | 11/2012 | Talluri | G06F 21/51 |
| | | | | 705/14.69 |
| 2014/0201126 | A1 * | 7/2014 | Zadeh | G06K 9/627 |
| | | | | 706/52 |

(Continued)

OTHER PUBLICATIONS

A matching recommendation algorithm for celebrity endorsement on social network Lv Hai-xia; Yu Guang; Tian Xian-yun 2013 International Conference on Management Science and Engineering 20th Annual Conference Proceedings Year: 2013 pp. 72-77, DOI: 10.1109/ICMSE.2013.6586264 IEEE Conference Publications.*

(Continued)

*Primary Examiner* — Michael B Holmes
(74) *Attorney, Agent, or Firm* — Norton Rose Fulbright Canada LLP; Niall Cooney

(57) ABSTRACT

A system and method are provided for targeting customers through social networks. Social media data of interest associated with a plurality of social media objects are extracted from at least one social networking platform. The social media data of interest are stored. The social media data are classified according to pre-defined categories. Based on the classifying, a subset of the plurality of social media objects relevant to a campaign targeting customers is identified. At least one social media object of the subset of social media objects is presented to a user in a form adapted to facilitate user action on the at least one social media object.

24 Claims, 23 Drawing Sheets

(56) References Cited

U.S. PATENT DOCUMENTS

| | | | | |
|---|---|---|---|---|
| 2014/0278976 | A1* | 9/2014 | Braytenbaum | G06Q 30/0255 |
| | | | | 705/14.53 |
| 2015/0032675 | A1* | 1/2015 | Huehn | G06Q 50/01 |
| | | | | 706/12 |
| 2016/0196499 | A1* | 7/2016 | Khan | G06N 5/048 |
| | | | | 706/52 |
| 2016/0203331 | A1* | 7/2016 | Khan | G06F 21/6245 |
| | | | | 726/1 |
| 2016/0328270 | A1* | 11/2016 | Bikkula | G06F 9/4881 |
| 2017/0017519 | A1* | 1/2017 | Khan | G06F 9/5083 |
| 2017/0018271 | A1* | 1/2017 | Khan | G10L 15/183 |

OTHER PUBLICATIONS

Online review analytics using word alignment model on Twitter data Lavanya T.; Miraclin Joyce Pamila J. C.; Veningston K. 2016 3rd International Conference on Advanced Computing and Communication Systems (ICACCS) Year: 2016, vol. 01 pp. 1-6, DOI: 10.1109/ICACCS.2016.7586388 IEEE Conference Publications.*

Multiple Subscriber-Identity-Module Detection Using Social Network Analysis Techniques Ahmed Maher; Ahmed Ghoneim 2014 IEEE International Conference on Data Mining Workshop Year: 2014 pp. 804-809, DOI: 10.1109/ICDMW.2014.83 IEEE Conference Publications.*

Gender Prediction in Random Chat Networks Using Topological Network Structures and Masked Content Michael Crawford; Xingquan Zhu 2015 IEEE International Conference on Information Reuse and Integration Year: 2015 pp. 174-181, DOI: 10.1109/IRI.2015.35 IEEE Conference Publications.*

International Search Report and Written Opinion for PCT/CA2014/000583 dated Oct. 17, 2012.

* cited by examiner

Case Information

Created May 07, 9:23 AM By 👤 Jane Coley
Last Modified May 07, 9:52 AM By 👤 Jane Coley
Open For 59 minutes and 39 seconds Type Of Case [Sales ▼]
Priority [Medium ▼]

Case Attributes ☑

Case Type | Wants TVCo. | Competitor Churn | Comparison Shopper | Referral | Other |

Case Status | Sale | Lead | Pending | No Sale |

Offer

Comments

In the Chat        About  Sign In  Go Express

Let's get you set up with ITC Express                    ① ·· ②    502

Free 7 day preview

Choose up to 5 streams of Twitter posts, each one dedicated to a specific brand. View them for 7 days to see your opportunities to help them find the products and services they're looking for and offer great customer service

Go Express!

To connect with people looking to buy new, or switch existing, products and services, try ITC Express. It can help you connect with and attract more customers today - this video will show you how.
$350 /mo  [Go Express]

*are required fields

| First Name* | Canada | Last Name* | Huehn |
| Country* | Canada ▾ | Province* | Ontario ▾ |
| City* | Toronto | Postal Code* | M3B2P1 |
| Company | In the Chat | Phone | 4165555555 |
| Email* | john@inthechat.com | Username* | johnITC |
| Password* | Toronto | Confirm Pass* | •••••••• | must be at least 8 characters long

[Continue to Step 2]

Let's get you set up with ITC Express

01 ... 02

It's as easy as drag and drop!

Click on and drag the brands below into the category buckets at the bottom of the page. Customize the name of each category by clicking on the name and entering your preferred title. To start you off with some ideas, you could customize your categories to "Sales" or "Retention" - or whatever you prefer.

Available Streams
Select, drag and drop your brand streams into the category buckets below

| Company D | Company D | Company H |
| Sales | Churn | Sales |
| 4 Subscribers | 6 Subscribers | 2 Subscribers |

| Company E | Company G | Company G |
| Churn | Churn | Churn |
| 5 Subscribers | 5 Subscribers | 4 Subscribers |

| Company F | Company F | Company I |
| Churn | Sales | Churn |
| 0 Subscribers | 0 Subscribers | 0 Subscribers |

Company B / Sales / 1 Subscribers
Company C / Churn / 1 Subscribers

COMPETITOR CHURN

Name

+ Add another customized category
Name

+ Add another customized category
Name

Company A / Sales / 1 Subscribers
Company A / Churn / 1 Subscribers

Company A

Confirm my selection

In the Chat    ✎ Compose

3628 Company B | 3611 COMPETITOR CHURN   Trial expires in 7 days | Go Express

Search ... 🔍

JOE @Suchaa   59m
My on demand not working
COMPANY B CHURN

Rob @22mary   2h
I'm sick of #CompanyB, with their overcharging
COMPANY B CHURN

Addie @addd   2h
Dear Company B your service is bad and I hate you
COMPANY B CHURN

Bane @ForentoRenee   2h
Company C got their act together... We watchin Dark Knight Rises
COMPANY B CHURN

---

Addie
@addd
Dear Company B your service is bad and I hate you
COMPANY B CHURN

512 FOLLOWERS | 53 FOLLOWING | 43 KLOUT | ☆ FAVORITE

↻ Follow

Addie @addd
Dear Company B your service is bad and I hate you
10:09 AM - 23 JUL 2013

Dear Company B your service is bad and I hate you author | @addd send

508

Authorize ITC Express to use your account?

This application will be able to:
- Read Tweets from your timeline.
- See who you follow, and follow new people.
- Update your profile.
- Post Tweets for you.
- Access your direct messages.

[Authorize app] [Cancel]

This application will not be able to:
- See your Twitter password.

In the Chat ▶

ITC Express
By In The Chat
inthechat.com

ITC Express

You can revoke access to any application at any time from the Applications tab of your Settings page. By authorizing an application you continue to operate under Twitter's Terms of Service. In particular, some usage information will be shared back with Twitter. For more, see our Privacy Policy.

FIG.5E

Welcome, Admin User Logout    602

ACME-GENERIC　　　　　　　　　⊘ Edit　　⊗ Delete

CODE　　　　　　　　　　　Active
ACME-GENERIC　　　　　　　false

CREATED　　　　　　　　　CREATED BY
Aug 8, 11:50 AM　　　　　　Omar

INCLUSIONS　　　　　　　　EXCLUSIONS

| ACME |
| ACME CustomerCare |
| ACME Business |
| ACME Deals |
| CompanyX |
| Company-X |

| Sent via BlackBerry by ACME sent from my |

PROXIMITY INCLUSIONS　　　PAIR EXCLUSIONS

Facebook Page id Inclusion　　From Usernames

Fetch Sources

URL INCLUSIONS

URL EXCLUSIONS

FIG.6B

Welcome, Admin User Logout    604

ABCInsurance-Campaign    ⊘ Edit   ⊗ Delete

CODE                          Active
ABCInsurance-Campaign         true

NUM CODE                      ICON
216

COMPANY                       PRODUCTION
ABC-Banking                   true

REGION                        DOMAIN
Hidden                        TELCO

COMPETITORS                   FILTER PROFILES
                              | ABC-Insurance |

PRODUCTS                      SENTIMENTS

TOPICS                        TYPES
| Topic: WEALTH |
| Topic: CARDS |

TAG RULES

CREATED BY                    CREATED
Admin User                    Jul 1, 4:56 PM LAST MODIFIED BY              LAST MODIFIED
Admin User                    Jul 11, 12:42 PM

FIG.6C

| ⌂ | ✳ Insights | | | | | | | | | | Logout |
|---|---|---|---|---|---|---|---|---|---|---|---|
| Client | | | | | | | | | | | |
| XYZ-Wireless | | | | | | | | | | | |

XYZ-Wireless

Category [Relevant ▸]  Type [All ▸]  Topic [All ▸]  Sentiment [All ▸]

Content Search [        ]  [?]  Time [30 Days ▸]  ↻

XYZ-Wireless                                                                                ⋮⬇

| | Other | PricingPromo | Hardware | Technical | CustomerService | Sales | BillingPayments | Cancel | Totals |
|---|---|---|---|---|---|---|---|---|---|
| Posts | 3,244 | 1,062 | 1,022 | 869 | 556 | 271 | 270 | 179 | 7,463 |
| Views | 1,017,043 | 261,338 | 224,249 | 200,939 | 127,067 | 65,953 | 55,402 | 45,482 | 1,997,472 |

Company A                                                                                   ⋮⬇

| | Other | PricingPromo | Hardware | Technical | CustomerService | Sales | BillingPayments | Cancel | Totals |
|---|---|---|---|---|---|---|---|---|---|
| Posts | 823 | 1,480 | 775 | 669 | 348 | 267 | 152 | 79 | 4,593 |
| Views | 219,993 | 487,018 | 159,119 | 123,351 | 65,265 | 63,082 | 32,313 | 27,736 | 1,177,877 |

Company B

Client
XYZ-Wireless

| | | | Sentiment | All ▼ | | |
|---|---|---|---|---|---|---|

XYZ BillingPayments ← Dispute/Overcharged (Total Posts : 59)    Page 1 - 2

XYZ

ROB  Sunday, July 14, 2013    [192]
Post by ROB
Watch your mobile phone bills closely.. I haven't looked at mine for the past few months and seen I was getting billed 9.99 for some third party company crap that I never subscribed !! Bad enough XYZ was already over charging on some stuff, un-promised discounts !! Oh well, my bad for not...
http://www.facebook.com/permalink.php?story/fbid=101517431

TAYLOR  Saturday, July 13, 2013    [257]
Post by TAYLOR
@XYZSolutions managed to remove my data package, not tell me, then try and charge me for it. Oh yeah and then remove my service.
http://twitter.com/taylor/statuses/35595

BLUESKY  Friday, July 12, 2013    [466]
Post by BLUESKY
XYZ JUST TEXTED MY HOW WE OWE $81.20 & I HAVE A $40

| | ments | Cancel | Totals |
|---|---|---|---|
| | 270 | 179 | 7,463 |
| | 55,402 | 45,482 | 1,997,472 |
| | 152 | 79 | 4,593 |
| | 32,313 | 27,736 | 1,177,877 |

Time [30 Days ▼]

Logout

704

SYSTEM AND METHOD FOR MANAGING TARGETED SOCIAL COMMUNICATIONS

CROSS-REFERENCE TO RELATED APPLICATIONS

This application claims the benefit of U.S. Provisional Patent Application No. 61/858,385, filed Jul. 25, 2013, the contents of which are hereby incorporated by reference in their entirety.

FIELD OF THE INVENTION

This invention relates to computer systems, methods, and solutions for managing marketing related communications. This invention further relates to targeting customers and potential customers using social networks.

BACKGROUND OF THE INVENTION

Across the world, social networks are becoming an increasingly popular communication medium. A large number of users use various social networks such as Facebook™, Linked In™, and Twitter™ to engage in a multitude of social communications on a variety of topics. The various social networking platforms, the social networks that their users create using such social networking platforms, and the various social interactions (including communications) between such social networks is generally referred to as the "social web". The social web has evolved into a medium, like email, except that it is more public.

Various enterprises promote and sell a wide range of products and/or services. Promotion and sales involve various sales activities, including various interactions between sales/marketing personnel and consumers, who are often social web users. The social web represents important sales/marketing opportunities for vendors. The social web is also important to vendors and other brands from a brand management and reputation management perspective. Social media interactions, including for example communications regarding a brand, can have a viral effect having significant positive or negative consequences. Business and government entities (collectively referred to as "brands" in this disclosure) are interested in taking advantage of these opportunities, and managing associated risk.

However, the social web is characterized by staggering volume of social communications and associated volume of data. Facebook™ and Twitter™ users alone generate more than 3.5 billion posts and comments per day. Add to this volume conversations happening on 300+ million blogs and forums and additional content being contributed via YouTube™, LinkedIn™, Pinterest™ and others. It is estimated that 32% of social media conversations are about companies, products and services, making this a critical channel for businesses, both to understand what is being said about their brands, people and products, and to engage with consumers to grow sales, deliver customer service and retain their consumer base.

For companies wanting to participate in social media, finding the posts that are relevant to their business can prove challenging enough. Traditional social media listening platforms (keyword/Boolean) deliver high volumes of posts that match search criteria, but that can be completely unrelated to a company's brand. For example, a search using the term "Apple" may return posts relating to Apple computers, Apple fruit and more; similarly, a search using the term "TD" may return posts relating to TD Bank, touchdowns, and more. Beyond this, understanding the content of these posts usually requires human beings to read and categorize each one individually—a costly and inefficient process (for example, the term "iPhone" is mentioned 14.5M times/month), which certainly does not permit for a timely response to posts other than those directed to the company's Twitter™ account or Facebook™ page (which addresses only part of the engagement opportunity).

The social web is also characterized by a rapid pace of development. The potential viral effect of social networking can result in a Tweet turning into a full blown public relations disaster for a brand, and there are numerous well documented examples of this phenomenon. Therefore acting on relevant social media objects quickly is essential and challenging.

There is a need for solutions that allow brands (or their service providers) to engage with individual, businesses, or consumers of interest to them from a variety of perspectives. They may be customers, potential customers, customers of a competitor whom they want to target, citizens with whom a brand wants to foster and maintain a positive brand reputation, and so on (may be referred to as a "customer" in this disclosure). There is a further need for solutions that allow brands to communicate with customers in an efficient and effective way, especially given the volume and rapid pace referred to previously.

There is a need therefore for a computer network implemented system, a computer network implemented method, and a computer network architecture that addresses at least some of the challenges referred to above. There is a further need for a computer network implemented system, a computer network implemented method, and a computer network architecture that addresses at least some of the challenges referred to above and that is easy to deploy, and allows the management of marketing communications in an efficient manner.

SUMMARY OF THE INVENTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In an aspect, there is provided a system for targeting customers through social networks. The system includes at least one processor, a network interface, and non-transitory computer-readable memory in communication with the at least one processor, the memory storing processor-executable instructions. The at least one processor, when executing the processor-executable instructions, causes the system to: extract social media data of interest associated with a plurality of social media objects from at least one social networking platform, by way of the network interface; store the social media data of interest in a data repository; classify the social media data of interest according to pre-defined categories; based on the classifying, identify a subset of the plurality of social media objects relevant to a campaign targeting customers; and present, to a user, at least one social media object of the subset of social media objects in a form adapted to facilitate user action on the at least one social media object.

In the system, the plurality of social media objects may include posts by customers to the at least one social networking platform.

In the system, extracting the social media data of interest may include selecting the plurality of social media objects from amongst available social media objects.

In the system, selecting the plurality of social media objects may include matching social media objects to at least one pre-defined keyword, user identifier, or source identifier.

In the system, classifying the social media data may include applying semantic text analysis to the social media data.

In the system, classifying the social media data may include processing the social media data using at least one classifier.

In the system, classifying the social media data may include training the at least one classifier.

In the system, training the at least one classifier may include providing feedback relating to classification accuracy to the at least one classifier.

In the system, the at least one classifier may include at least one of a Naive Bayes, a Support Vector Machine, a Max Entropy, a Generalized Linear Model, a Logistic Regression, a Decision Tree, a Random Forest classifier, and a Probabilistic Graphical Model.

In the system, identifying the subset of social media objects may include identifying the social media objects of the plurality of social media objects classified into categories defined to be associated with the campaign.

In the system, the pre-defined categories may include categories relating to a particular company.

In the system, the pre-defined categories may include categories relating to particular competitors of the particular company.

In the system, the user action may include generation of a social media object responsive to the at least one social media object.

In another aspect, there is provided a computer-implemented method of targeting customers through social networks. The method includes: extracting social media data of interest associated with a plurality of social media objects from at least one social networking platform; storing the social media data of interest; classifying the social media data of interest according to pre-defined categories; based on the classifying, identifying a subset of the plurality of social media objects relevant to a campaign targeting customers; and presenting, to a user, at least one social media object of the subset of social media objects in a form adapted to facilitate user action on the at least one social media object.

The method may further include measuring a rate at which social media data of interest are extracted from the at least one social networking platform.

The method may further include analyzing the social media data of interest to calculate a likelihood that a customer will engage in an pre-defined activity of interest.

The method may further include submitting, to a social networking platform, a social media object responsive to the at least one social media object.

In the method, the extracting the social media data may include receiving the social media data by way of a network.

In the method, the social media objects may include posts by customers to the at least one social networking platform.

In the method, extracting the social media data of interest may include selecting the plurality of social media objects from amongst available social media objects.

In the method, selecting the plurality of social media objects may include matching social media objects to at least one pre-defined keyword, user identifier, or source identifier.

In the method, classifying the social media data may include applying semantic text analysis to the social media data.

In the method, classifying the social media data may include processing the social media data using at least one classifier.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

FIGS. 4a, 4b, 4c, 4d, 4e and 4f show exemplary screens and associated functions of a sale and service portal according to one embodiment of the platform of FIG. 1;

FIGS. 5a, 5b, 5c, 5d, 5e, and 5f show further exemplary screens and associated functions of one embodiment of the platform of FIG. 1;

FIGS. 6a, 6b, 6c, and 6d show further exemplary screens and associated functions of a management portal according to one embodiment of the platform of FIG. 1;

FIGS. 7a, 7b, and 7c show further exemplary screens and associated functions of an insights portal according to one embodiment of the platform of FIG. 1.

DETAILED DESCRIPTION

Definitions

Figure 1:
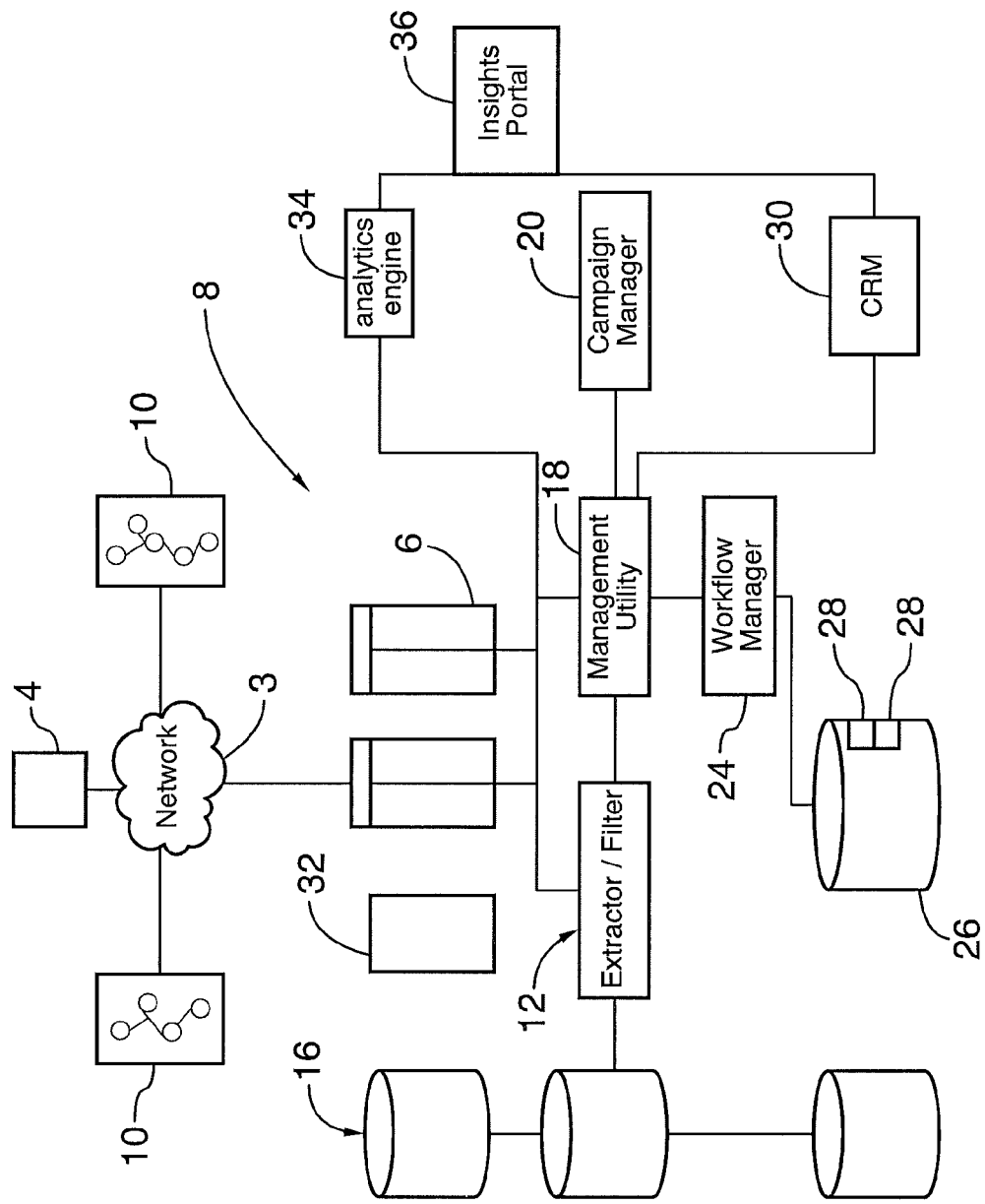
FIG. 1 is a system diagram illustrating components of the present invention, in one representative implementation thereof.

In this disclosure, "social networking platform" refers to any computer network implemented application platform that is operable to generate a series of webpages so as to define a series of user interactions and/or workflows, including social media interactions, that define a social networking environment. "Social networking platform" includes social media content aggregators such as, e.g., radian6™ and GNIP™.

"Social media interactions" refer to the various interactions between users of a social networking platform (including "friends"), including various communications (such as platform messaging, instant messaging, videoconferencing, voice messaging, etc.), uploading or posting content in one or more media, downloading content in one or more media, watching content in one or more media, reviewing or rating content including "objects", taking a quiz, selling or trading items such as "objects", and so on.

"Topic" refers to a topic that is relevant to a brand objective, such as a sales objective or a brand reputation management perspective. By operation of the present invention, campaign personnel engage in platform managed social media interactions around "topics".

"Campaigns" refer to a promotional, information, marketing, or sales campaigns that may be related to one or more "topics".

"Campaign personnel" refers to individuals engaged by a brand, or on behalf of a brand (by the operator of the platform, an advertising agency or other entity) to manage campaigns using the platform. Campaign personnel may also refer to automated, computer implemented software agents who engage in certain campaign related functions automatically.

"Clients" refer to clients of the computer system or platform of the present invention, such as a brand or a company engaged by a brand, who are given access to the computer system or platform of the present invention, whether by subscribing to the computer system or platform or otherwise.

"Social media objects" include any content or media object that may be used or consumed in connection with social networking interactions, such as for example a social posting, social feed, a message, a use case, a video, quiz, a tip, a discussion, a digital good, etc.

"Social media data" refer to data extracted from social media objects that is likely to contain data relevant to a brand, or a product or service of a brand, for example a social posting, social feed, a message, a discussion, a video comment, or the like.

"Actionable social media objects" refers to the output of the platform, namely a filtered/classified set of social media objects that are relevant to one or more active campaigns, and optionally are acted upon using platform features for example by campaign personnel.

"Customers" refer to customers, potential customers, or other targets for campaigns of clients.

Platform

The present invention provides a computer network implemented system, a computer network implemented method, and a computer network architecture that allows clients to target customers systematically using the social web.

One aspect of the present invention is that it provides a solution for extracting social media data of interest, from a significant volume of social media objects, in a way that allows campaign personnel to act on specific social media data, on a timely basis.

FIG. 1 shows a representative system diagram illustrating a possible implementation of the present invention. As depicted, the computer network implemented system of the present invention may be implemented as a platform (8) that connects to one or more social media platforms (10) and one or more end-user devices (4) by way of a network (3). As detailed below, network (3) may be the Internet.

The platform (8) extracts data (11) related to social media objects from social media platforms (10) using a novel and innovative extractor/filter system (12). The extractor/filter system (12) may be used to connect to social media platforms (10) to access a broad range of different social media objects, and extract a subset of these social media objects that may be of interest, or social media data, based one or more active campaigns.

The platform (8) presents a plurality of dashboards and user portals that may be accessed by users (e.g., clients and campaign personnel) operating end-user devices (4).

The platform (8) may include a server computing device (6), as detailed below, or server farm, and which may also include an application repository. Server computing device (6) is adapted to execute computer-executable instructions to provide the functionality of the platform (8), as detailed below.

The platform (8) harvests social media data such as millions of social media posts, across a potentially large number of social media sites, in real time or near real time. The cumulative social content is text mined for actionable insights such as sales leads or service opportunities. An important aspect is that the actionable insights are delivered in way that resolution is possible at the root cause or on an individual level, as further explained below.

The platform (8) provides many advantages including reduction of resources required to manage customer care centre, revenue growth and improved customer satisfaction.

Figure 2:
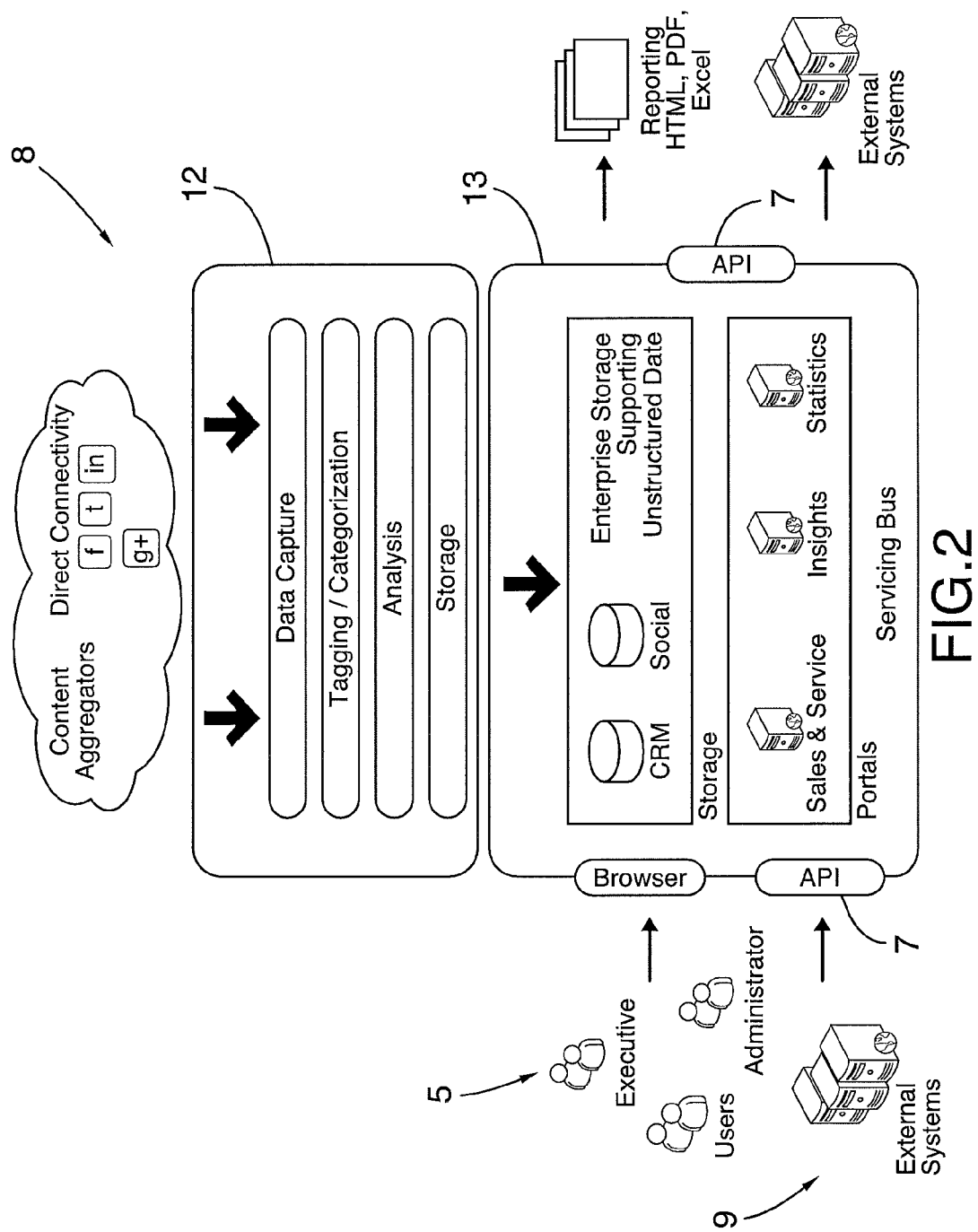
FIG. 2 is a system diagram that illustrates the architecture and resources of the platform of FIG. 1.

FIG. 2 shows a possible solution architecture for implementing the platform. Social media objects may be obtained from a social networking platform (10) over network (3), i.e., through direct connectivity to a social network or through content aggregators such as radian6™, GNIP™, or the like. The extractor/filter system (12) may connect to a servicing bus (13) that includes the various other utilities or functions of the present invention.

For example, the servicing bus (13) may provide dashboards and user portals in the form of webpages, allowing users (5) to configure platform (8) or receive reports regarding the operation of platform (8), as further detailed below. Users (5) may, for example, be clients or campaign personnel. The servicing bus (13) may also expose one or more APIs (Application Programming Interfaces) (7) allowing suitably configured external systems (9) to interact with platform (8), e.g., to retrieve reporting data (e.g., performance reports, statistics, etc.), or to input configuration data (e.g., campaign configuration parameters, client parameters, etc.)

Referring again to FIG. 1, in one aspect, a computer system is provided that allows the systematic targeting of customers through the social web, and is configured to: (A) extract social media data from social media objects in a way that has a low threshold of relevance; (B) store the data into one or more data repositories (16); and (C) apply one or more classifying techniques to the data repository (16) in order to map a subset of the social media objects to categories. Categories relate generally to active campaigns, as explained below. The classification or categorization uses the social media data to filter social media objects to establish only those relevant to a relevant process or workflow in the platform at a higher threshold of relevance. The platform (8) then includes components that implement one or more workflows (usually executed by campaign personnel but some workflows may be automated or may include automated steps) for acting on the actionable social media objects.

Contrary to prior art social media listeners, that generally continuously access and analyze social media interaction streams, and tend to either generate many hits including irrelevant results, or miss relevant results, the two-tiered approach of the present invention, wherein first social media streams of interest are compiled in a data repository (16), applying little to no filtering (e.g., filtering may be mainly based on social networking source) and then trained classification processes are applied, based on specific attributes (such as attributes defined based on an active campaign) yields relevant results, with a smaller number of relevant results being missed as compared to prior art solutions. Further details are provided under the heading "Categorizing".

In one possible implementation, the data repository (16) may be subject to a variety of database management processes. For example, timely social media data is of interest and becomes dated quickly. Accordingly, records may be deleted from the data repository (16) automatically after a certain date, and new social media data may be extracted continuously and stored in the data repository (16) in real time or near real time. The social media data being filtered therefore, and used to create action items in the platform (8) may be relatively current data so as to respond to the need for act on relevant social media interactions quickly.

In one implementation, a management utility (18) (which may be associated with one or more dashboards) may be linked with the extractor/filter system (12). The management utility (18) allows one or more administrative users to set the parameters for extracting social media data and then filtering social media data to identify specific social media data of interest based on one or more active campaigns registered to the platform (8).

In one possible implementation, the parameters for extracting social media data in the first stage of extraction/filtering relate to identifying social media objects that may be relevant to a particular vertical, the vertical being relevant to a group of clients of the platform (8). Examples of a vertical include "WIRELESS", "MOBILE APPLICATIONS", "BANKING", or "CABLE". The extractor/filter system (12) may include a range of semantic filters to perform semantic text analysis on social media objects, and associated taxonomies for identifying social media objects that may have relevance to one or more of such verticals. In one aspect of the invention, the management utility (18) may include one or more tools that enable the management of relevance and other related factors for configuring the thresholds associated with filtering and classifying social media data.

In one aspect, it may be preferable to set the thresholds relatively low (for the purpose of the first tier, or the extraction of social media data from the social media objects) in order to extract into the one or more data repositories (16) a significant volume of information that is nonetheless manageable, based on utilization of a reasonable amount of data storage and processing resources.

For example, in relation to one or more campaigns related to "CABLE" customers, the extractor/filter system (12) first locates, extracts, and stores to an associated data repository (16), on a regular basis, blog entries, FACEBOOK™ entries, Tweets and so on that are "CABLE" related. In some embodiments, extractor/filter system (12) locates, extracts, and stores social media objects continuously and in real-time or near real-time.

In another aspect, the extractor/filter system (12) may locate, extract, and store social media objects that date to a user-configured time period, e.g., those social media objects created in the last 24 hours or last week. Conveniently, this allows extractor/filter system (12) to retrieve objects in bulk, as may be needed in the event of data loss from a data repository (16) or other system failure.

In yet another aspect, the extractor/filter system (12) may be configured (e.g., by way of a management portal detailed below), to generate alerts based on measuring a flow rate of social media objects through the system. Alerts may be keyed to a threshold corresponding to a particular number of social media objects located/extracted/stored over a particular time period. By way of example only, an alert may be generated if the number of social media objects located/extracted/stored within the last 24 hours is less than a pre-set minimum threshold (e.g., 10), or if the number of objects in the last hour is more than a pre-set maximum threshold (e.g., 100). Conveniently, such alerts may be used to alert users when the flow rate of social media objects into the platform (8) is below the minimum threshold, indicative of a starvation state, or to alert users when the flow rate is above the maximum threshold, indicative of a flooding state.

In a particular implementation of the present invention, various extraction methods or routines may be used by the extractor/filter system (12).

Various campaigns are possible for example: (A) a client may be interested in targeting customers who are unhappy with their services for the purpose of addressing their concerns and keeping the customer, or (B) a client may be interested in targeting customers who are unhappy with a competitor for the purpose of attempting to have the customer deal with the client.

The management utility (18) also provides a series of tools for managing the parameters associated with filtering data relevant to social media objects from the data repositories (16) (using classification as explained below), based one or more campaign profiles. For example, a data repository (16) associated with "MOBILE" may be linked to one or more campaigns for targeting customers. For example, one campaign for Mobile Carrier A may relate to identifying (A) customers in the social web that are making negative comments about Mobile Carrier A or its services or (B) customers in the social web that are making negative comments about one or more competitors of Mobile Carrier A, i.e. Mobile Carrier B and Mobile Carrier C.

In (A), a campaign may consist of (i) detecting relevant social media interactions, (ii) connecting with the relevant customers directly and on a timely basis through the relevant social networking platform, and optionally (iii) engaging with the relevant customer in a way designed to retain the customer, or minimize possible negative repercussions on the brand of Mobile Carrier A.

Relevant social media objects include social media data that maps to one or more active campaigns as configured using the campaign manager (20).

In (B), a campaign may consist of (i) detecting relevant social media interactions, (ii) connecting with the relevant customers directly and on a timely basis through the relevant social networking platform, and optionally (iii) engaging with the relevant customer in a way designed to solicit them to move their business from for example Mobile Carrier B or Mobile Carrier C to Mobile Carrier A. Other uses include service improvement, support escalation, responding to technical questions regarding products or services.

In one implementation, the platform (8) includes a workflow manager (24). The workflow manager (24) may be used to design and deploy one or more processes or workflows related to targeting customers. For example, the workflow manager (24) may be used to configure and deploy one or more rules for engaging with customers, include presentation of particular content to campaign personnel. Content such as draft social media communications may be stored to a database (26).

The database (26) may include one or more templates (28) that may include rules and/or content created for different verticals or client types, which may be used for example as a starting point for configuring workflows and content related to a particular campaign, using the workflow manager (24).

In one aspect of the computer system, features of the management utility (18) related to the first-level extraction of data related social media objects may be configured by the operator of the platform (8).

In another aspect of the present invention, other features of the management utility (18) may be used to configure one or more processes for categorizing or classifying the contents of one or more data repositories (16), as further explained below. The management utility (18) may include a series of functions that are used to train the classification algorithms for a particular active campaign, as explained below.

In another aspect of the present invention, the extractor/filter system (12), applies second level filtering to the relevant data repository (16). In one possible implementation, the second level filtering uses one or more text analysis techniques to find social media objects of interest, using classification techniques and optionally also statistical analysis techniques (for example to rank or score returned social media objects for relevance for a particular campaign or workflow).

In one aspect of the present invention, the platform (8) includes a campaign manager (20). The campaign manager (20) may be implemented in a number of ways including as part of a web application. The campaign manager (20) may include functions and features similar to a campaign manager system or platform used to design and implement online advertising campaigns. The platform (8) may also integrate with one or more third party campaign managers.

In another aspect of the present invention, the platform (8) includes, or links to, a CRM (30). The CRM (30) may include a series of features that are used by campaign personnel to manage sales/marketing related communications in conjunction with the social web. Another contribution of the present invention is the integration of a CRM (30) into a platform connected to the social web. The CRM (30) may include: (i) smart scheduling functions; (ii) allocation of tasks to particular campaign personnel; (iii) monitoring of campaign personnel activities, and so on.

The CRM (30) may be implemented as a sales and service portal that presents to campaign personnel actionable tickets such as actionable sales leads, requests for service support, or brand management opportunities.

In another aspect of the present invention, the platform (8) includes a conventional HTTP server application (e.g., Apache HTTP Server, nginx, Microsoft IIS, or the like) adapting platform (8) to present dashboards, portals, and other interfaces in the form of webs to web-enabled computing devices, e.g., end-user devices (4) operated by users (5).

Figure 3:
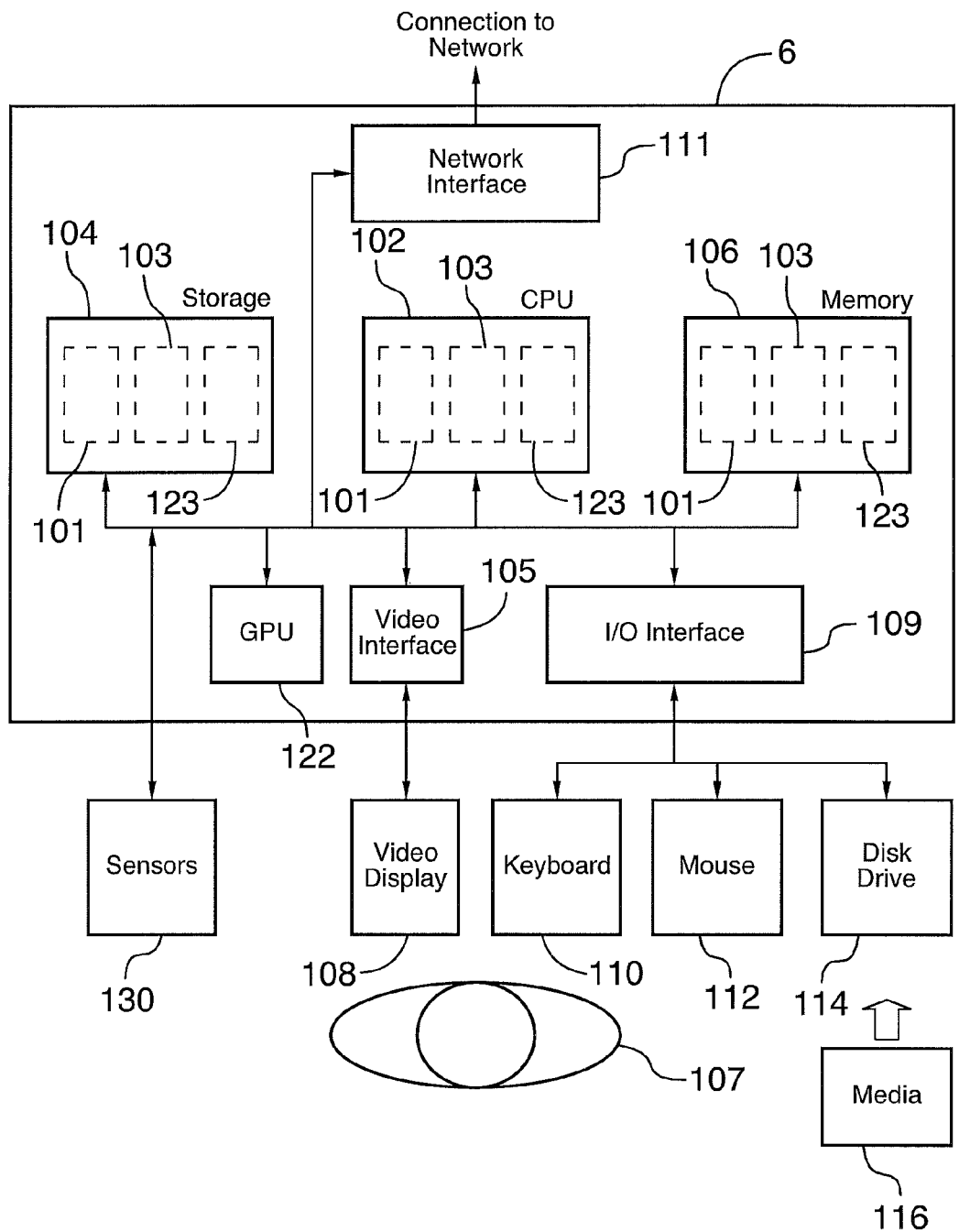
FIG. 3 is a schematic diagram of a server of FIG. 1.

FIG. 3 schematically illustrates a server computing device (6) of FIG. 1, in accordance with one example embodiment of the present invention. As shown, the server computing device (6) may include at least one central processing unit ("CPU") (102) connected to a storage unit (104) and to memory (106).

CPU (102) may be any type of processor, such as, for example, any type of general-purpose microprocessor or microcontroller (e.g., an Intel™ x86, PowerPC™, ARM™ processor, or the like), a digital signal processing (DSP) processor, an integrated circuit, or any combination thereof.

Storage unit (104) may include one or more storage devices such as a hard disk, solid-state disk, or the like. Storage unit (104) may also be partly or wholly cloud-based, accessible via a network such as network (18).

Memory (106) may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

The CPU (102) may process an operating system (101), applications (103), and data (123). Data (123) may include data corresponding to the one or more webpages (24). The operating system (101), applications (103), and data (123) may be stored in storage unit (104) and loaded into memory (106), as may be required. Operating software (101) may, for example, be a Microsoft Windows™, Unix™, Linux™, OSX™ operating system or the like.

Applications (103) and data (123), when processed at CPU (102), provide the functionality of the platform (8), including service bus (13), described herein. Application (103) and any components thereof may each be implemented in a high level procedural or object oriented programming or scripting language, or both. However, alternatively applications (103) and any components thereof may each be implemented in assembly or machine language, if desired. The language may be a compiled or interpreted language.

The server computing device (6) may further include a graphics processing unit (GPU) 122 which is operatively connected to CPU (102) and to memory (106) to offload intensive image processing calculations from CPU (102) and run these calculations in parallel with CPU (102).

An operator (107) may interact with the server computing device (6) using a video display (108) connected by a video interface (105), and various input/output devices such as a keyboard (110), mouse (112), and disk drive (114) connected by an I/O interface (109). In known manners, mouse (112) may be configured to control movement of a cursor in video display (108), and to operate various graphical user interface (GUI) controls appearing in the video display (108) with a mouse button. Disk drive (114) may be configured to accept computer readable media (116).

The server computing device (6) may connect to one or more networks such as network (3) via network interface (111). Network interface (111) allows the server computing device (6) to communicate by way of wired or wireless communications with other computing devices such as end-user devices (4) and social networking platforms (10) by way of network (3).

The server computing device (6) may be embodied in various form factors including one or more desktop and laptop computers, and wireless mobile computer devices such as tablets, smart phones and super phones. It will be appreciated that the present description does not limit the size or form factor of the computing device on which the present system and method may be embodied.

Each end-user device (4) (FIG. 1) may be a conventional computing device configured to connect with and access services provided by other computing devices by way of a network, e.g., server computing device (6) by way of network (3). Each end-user device (4) may include a processor, network interface, display, and memory, allowing the device to execute a conventional browser such as Microsoft Internet Explorer, Mozilla Firefox, Google Chrome, Apple Safari, or the like. In some embodiments, some or all of the end-user devices (4) may have an architecture similar to that shown for server computing device (6) in FIG. 3. So, each end-user devices (4) may be a desktop computer, a laptop computer, a netbook computer, a tablet computer, a personal digital assistance, a smart phone, or the like. Although only one end-user device (4) is depicted in FIG. 1, there may be any number of end-user devices (4), all of which may be serviced concurrently by one or more server computing devices (6).

Network (3) (FIG. 1) may be any network capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Representative screenshots of a sales and service portal of platform (8), provided by servicing bus (13), are shown in FIGS. 4a to 4f, according to one possible embodiment. The sales and service portal may be presented to users operating end-user devices (4) in the form of one or more webpages.

In particular, FIG. 4a shows a screen (400) for opening a "case" in the sales and service portal, for enabling detailed performance reporting. As shown, screen (400) includes input fields allowing a user to specify the type of case, the priority of the case, the status of the case, etc. Other case attributes may also be entered by way of screen (400).

Figure 4B:
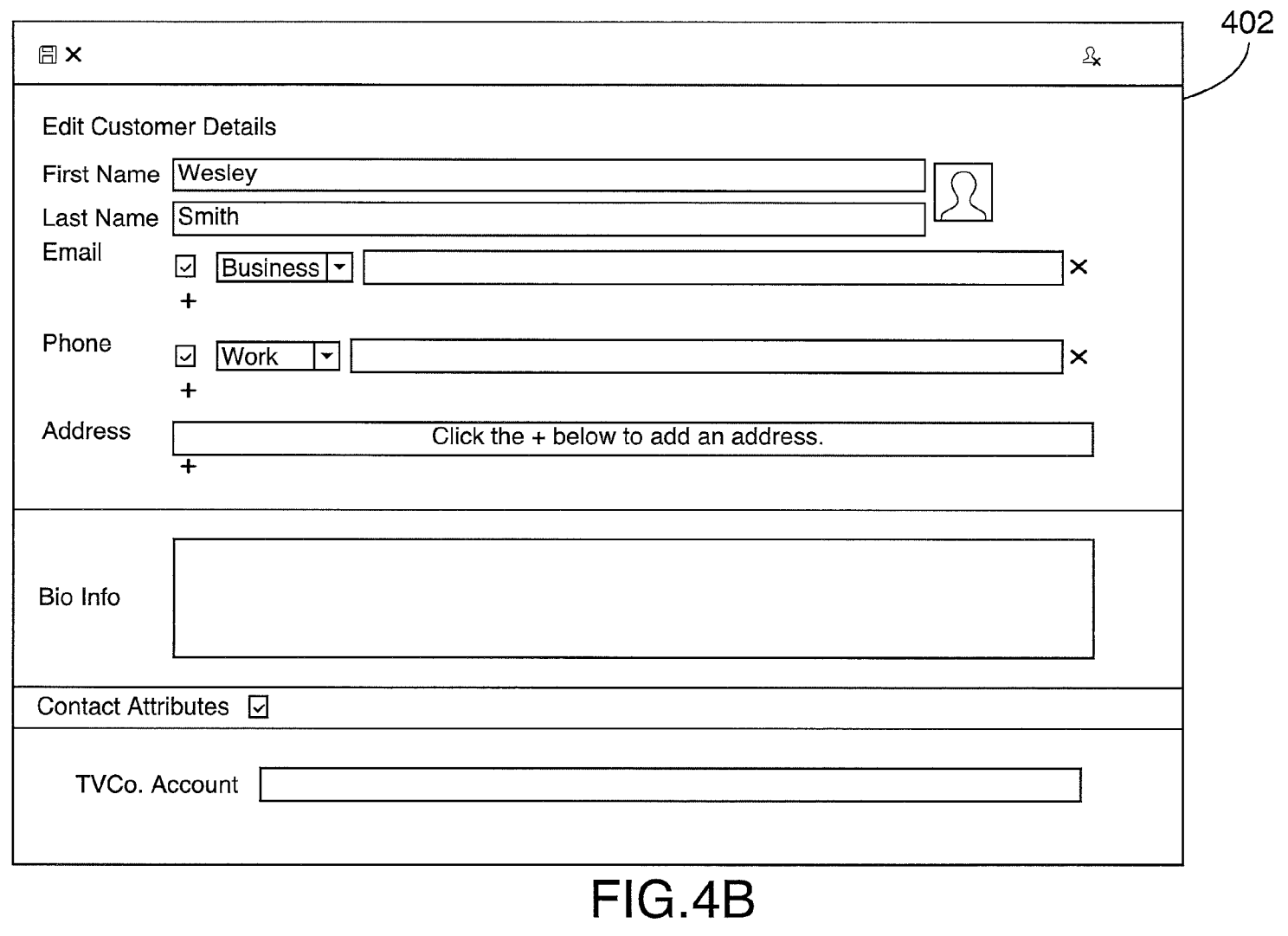

FIG. 4b shows a customer detail screen (402), which shows that in the sales and service portal of the present invention customer profiles can be connected from an existing CRM solution to social media users. Screen (402) includes fields for entering/modifying customer attributes such as name, contact information, biographical information, etc.

Figure 4C:
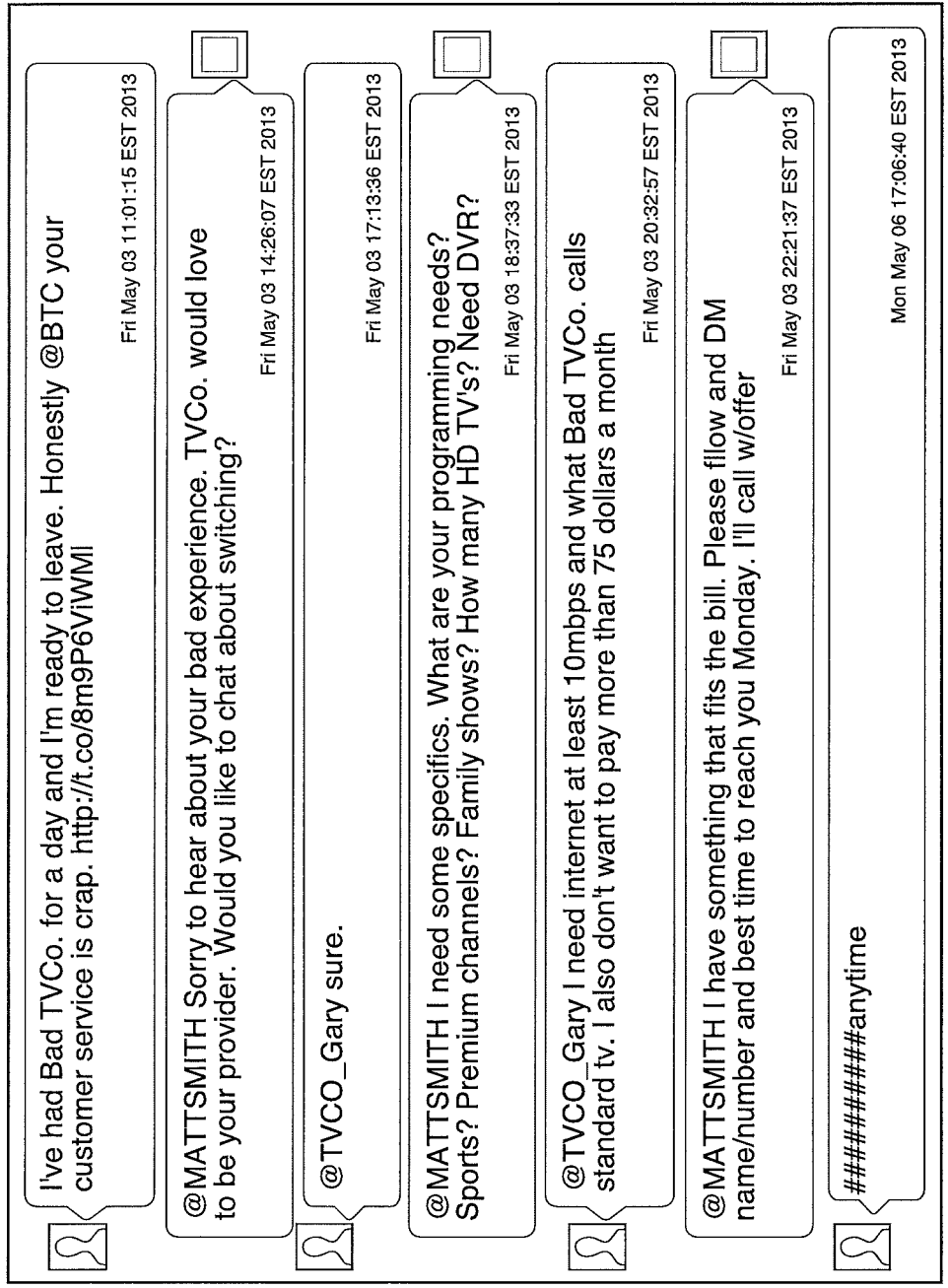
Figure 4D:
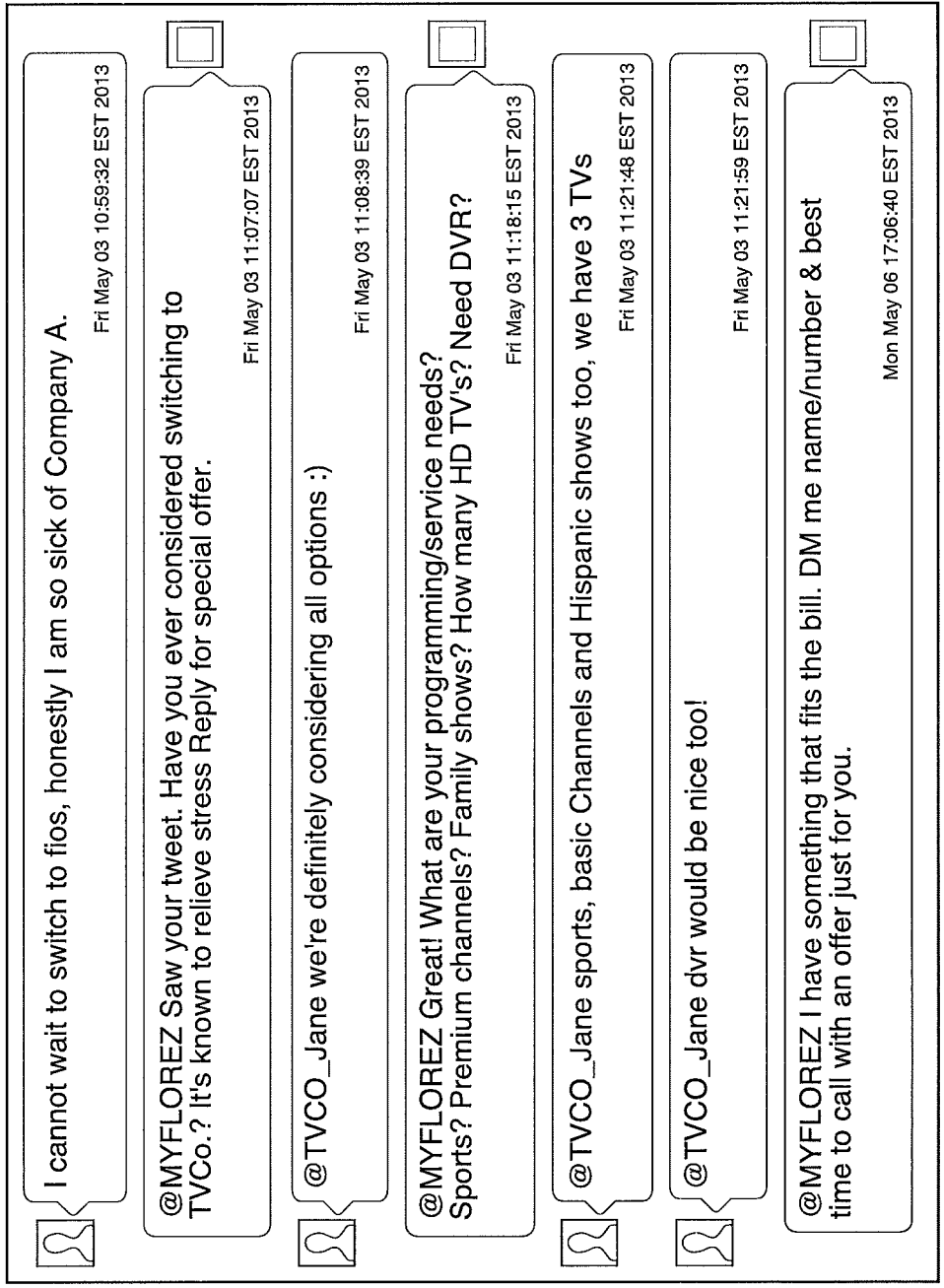
Figure 4E:
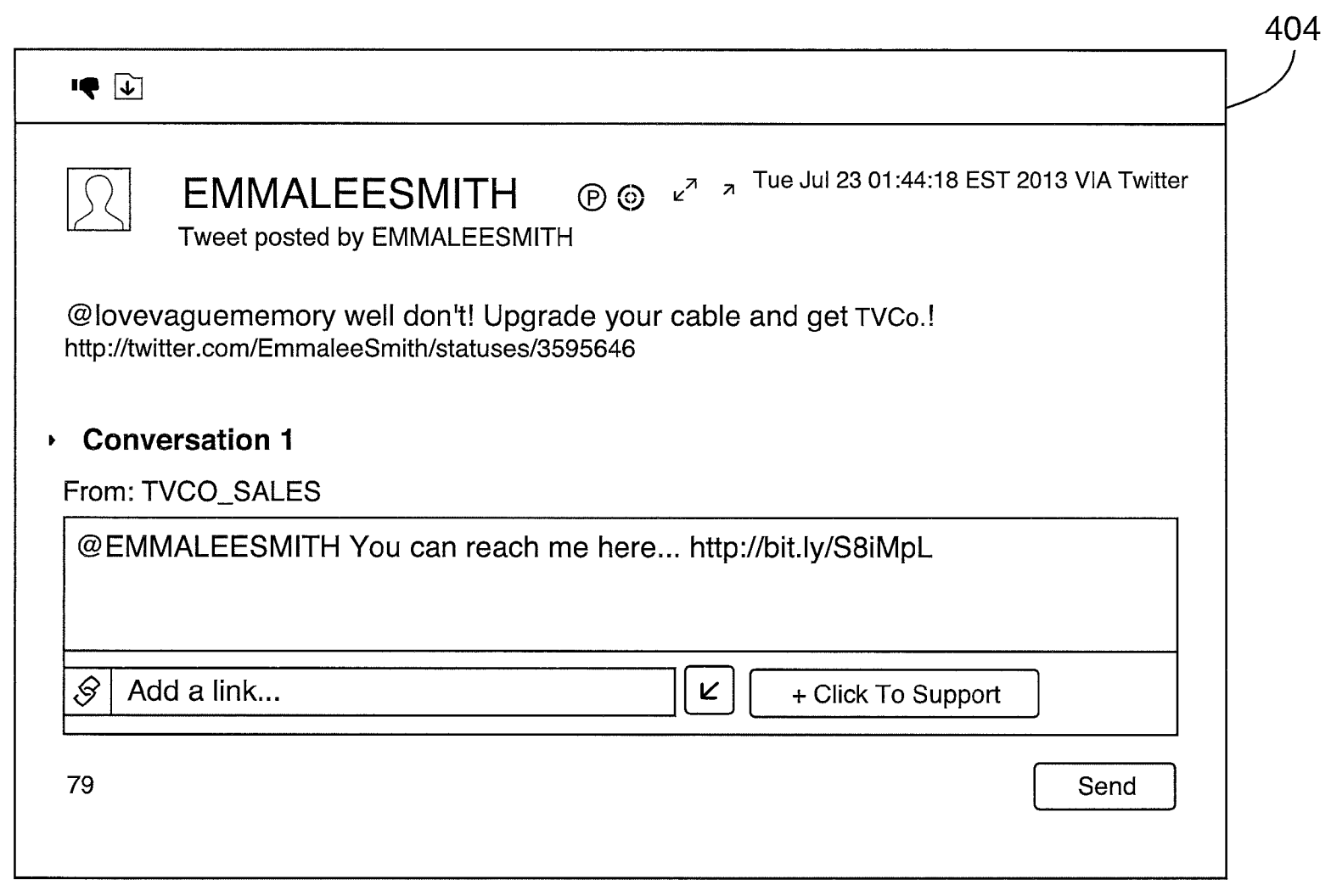
Figure 4F:
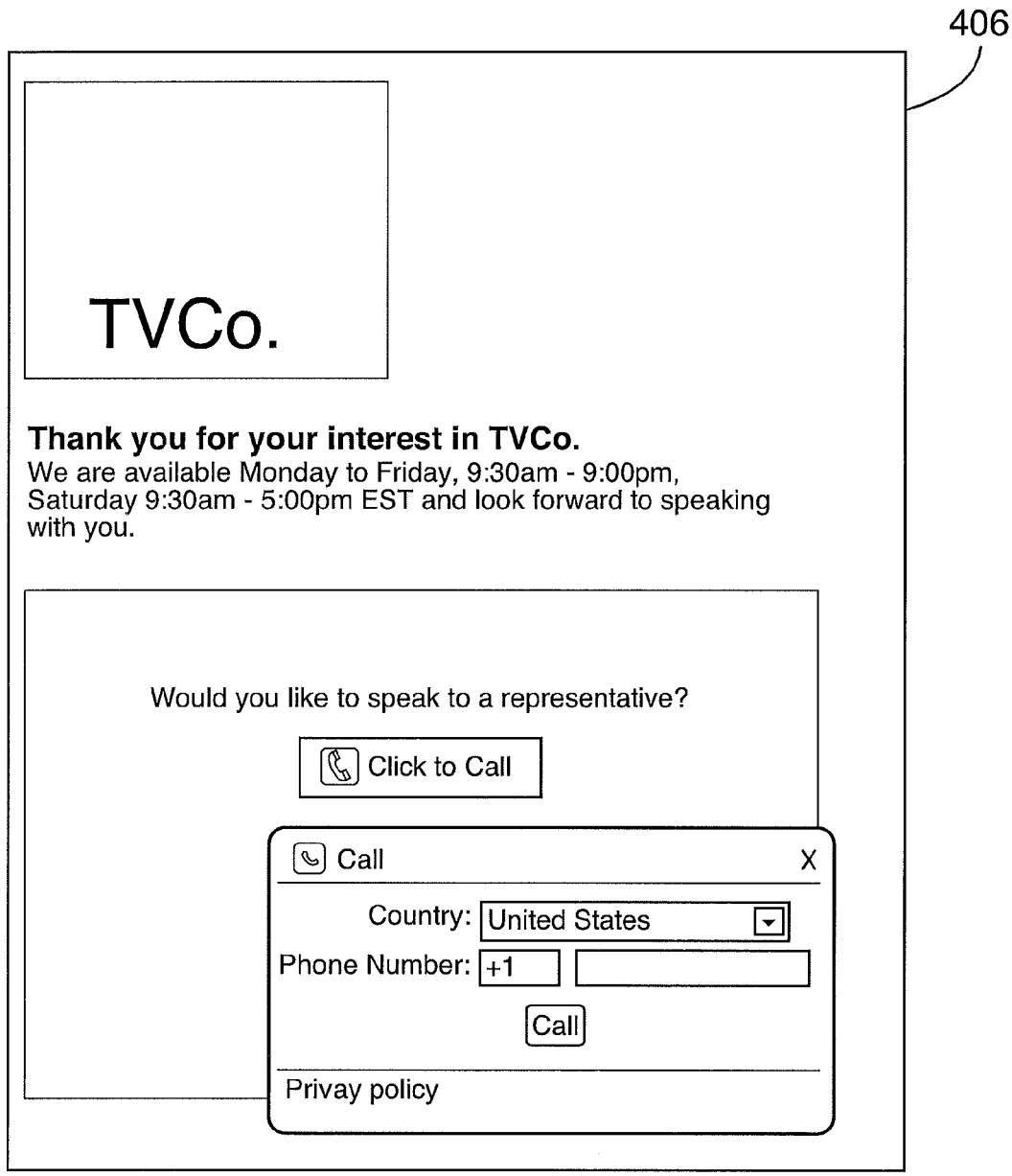

FIGS. 4c and 4d show sample interactions where various relevant social media objects are responded to directly by an agent or campaign personnel, based on features of the platform (8). By way of such interactions, efficiency of customer service and/or customer relations may be improved.

FIG. 4e shows a social media action screen (404), which shows that social media objects (e.g., a customer's Twitter™ post) can be displayed in the sales and service portal in an actionable form This makes the social media objects actionable in a number of different ways, e.g., by including "click to support" features, click to call, chat options and so on. These tools leverage features of the communication utility (32) detailed below, and may expose various functions to both customers and service personnel. For example, a request to move to phone/chat by a customer results in the window shown in FIG. 4f being opened (screen (406)). As shown, screen (406) allows a customer to request to speak to service personnel by phone.

FIGS. 5a to 5f show a different set of exemplary screens of platform (8) according to one possible embodiment. Each of these screens may be presented to users operating end-user devices (4) in the form of one or more webpages.

Figure 5A:
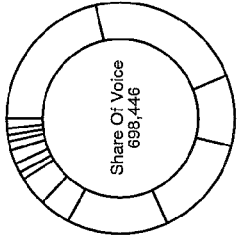

In particular, FIG. 5a shows a screen (500) of a landing page for the platform (8). As shown, screen (500) includes a summary of social media activity relating to a number of companies. This summary may include the number of customers identified as being interested in buying a company's products or services, the number of customers identified as being at risk of leaving a company. Such numbers may be provided by analytics engine (34), detailed below. Screen (500) also includes a live social media feed (e.g., a Twitter™ feed) showing social media objects (e.g., corresponding to Tweets). In this way, social media activity of customers and overall customer sentiment towards particular companies may be monitored in real time or near real time.

FIG. 5b shows a screen (502) of an exemplary sign up page for users (e.g., clients or campaign personnel).

FIG. 5c shows a screen (504) of an interface associated with the management utility (18) that allows a user to select social media streams of interest to the user. Each stream comprises social media content identified as being related to a particular company, and identified as belonging to a particular category of content (e.g., relating "sales" or "retention"). As shown, the user may select streams for the user's company or for competitors.

FIG. 5d shows a screen (506) of a possible dashboard allowing a user to view social media content for a selected stream (or streams).

FIG. 5e shows a screen (508) of an authorization page allowing a user to authorize the platform (8) to access a social media platform (10) (e.g., Twitter™) using the credentials of the user. With such authorization, the platform (8) may create and submit social media content on behalf of the user to the social media platform (10), and act on particular social media objects on behalf of the user.

Figure 5F:
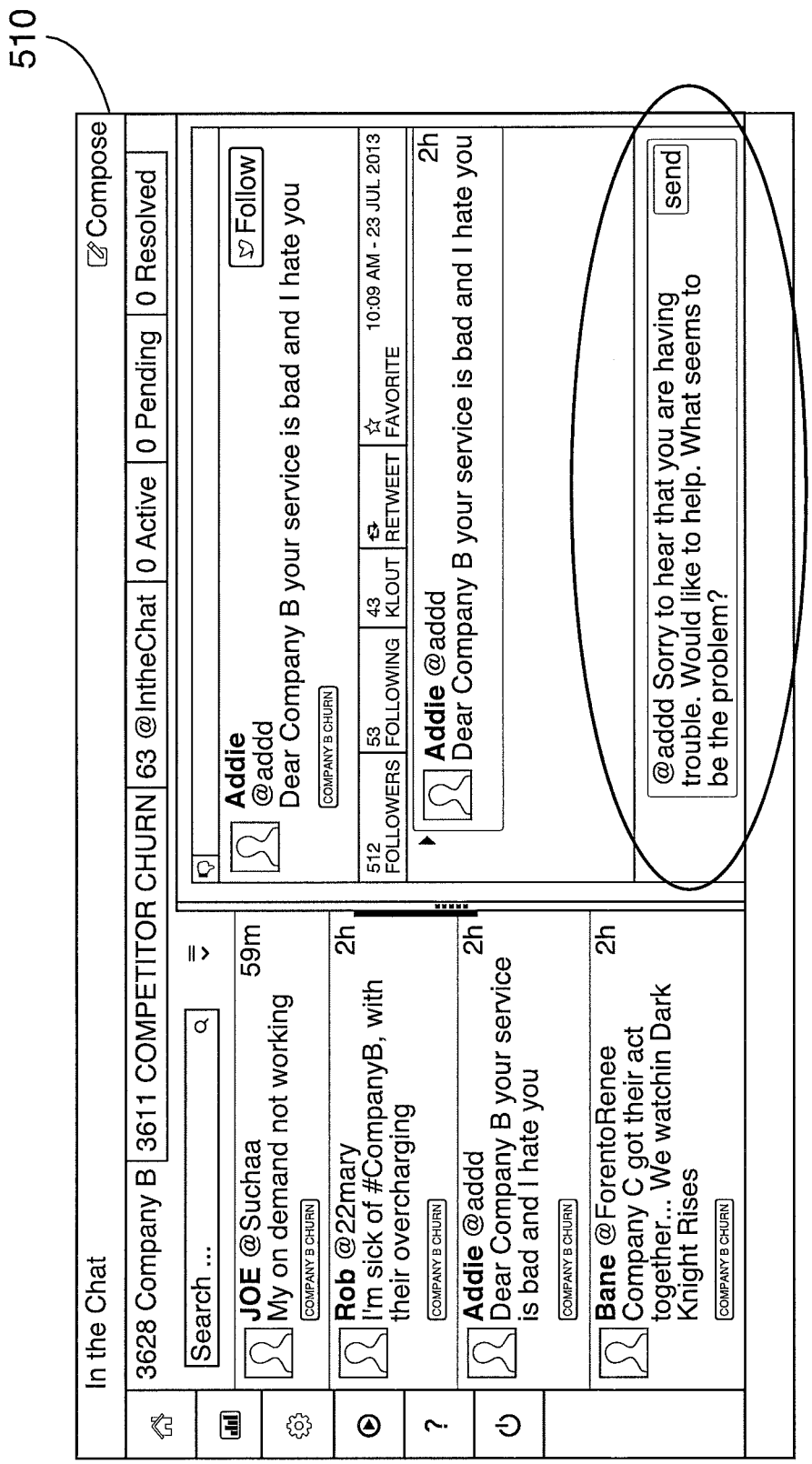

FIG. 5f shows a screen (510) of a possible dashboard allowing a user to act on a particular social media object presented to the user in a selected stream. As shown, the dashboard allows the user to respond to the social media object from a customer—in this case, a Tweet—by posting a responding Tweet to the customer. Conveniently, the platform (8) allows the user to respond to the Tweet and create a responding social media object without the need to directly access the Twitter™ platform. The responding social media object may then be submitted by platform (8) to the Twitter™ platform on behalf of the user. Customer service efficiency may thereby be improved. In this way, the platform (8) improves the speed and scope of customer engagement, which may allow a client to win or save the business of those engaged customers.

Representative screenshots of a management portal of the platform (8) are shown in FIGS. 6a to 6d, according to one possible embodiment. The management portal may be presented to users operating end-user devices (4) in the form of one or more webpages.

Figure 6A:
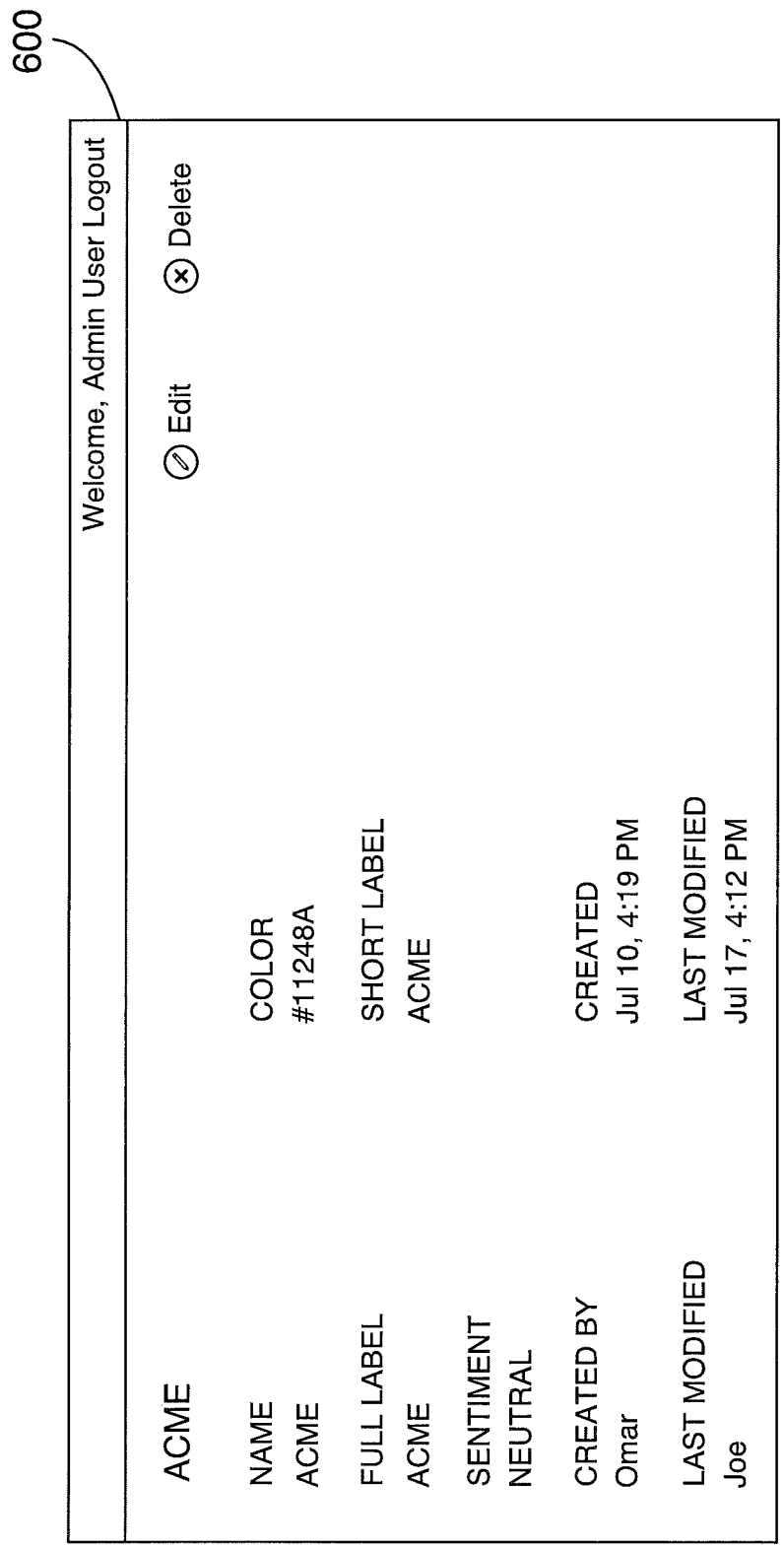

In particular, FIG. 6a shows a screen (600) of the management portal allowing a user to define the parameters of a company that may be subject of a campaign.

FIG. 6b shows a screen (602) of the management portal allowing a user to define rules for selecting social media objects (e.g., posts) from amongst available social media objects in the social web, for extraction and storage in repositories (16). For example, a user may define rules for including objects, e.g., on the basis of keywords, social media IDs (e.g., a Facebook™ page, or Twitter™ ID), source URLs, etc. Similarly, a user may define rules for excluding objects, e.g., on the basis of keywords, social media IDs, source URLs, etc. Objects may also be included or excluded on the basis of co-located keywords. In this way, a user may control the data that flows into the system from social media networks or aggregators. As will be appreciated, a rule set that is too restrictive may cause relevant social media objects to be missed. Conversely, a rule set that is too permissive may flood the system with irrelevant content. In some embodiments, the management portal may suggest pre-defined default rules, or automatically generated rules.

FIG. 6c shows a screen (604) of the management portal allowing a user to define parameters for a particular campaign. As depicted, a user may define topics associated with the campaign, competitors of the company subject of the campaign, the company's products, etc.

Figure 6D:
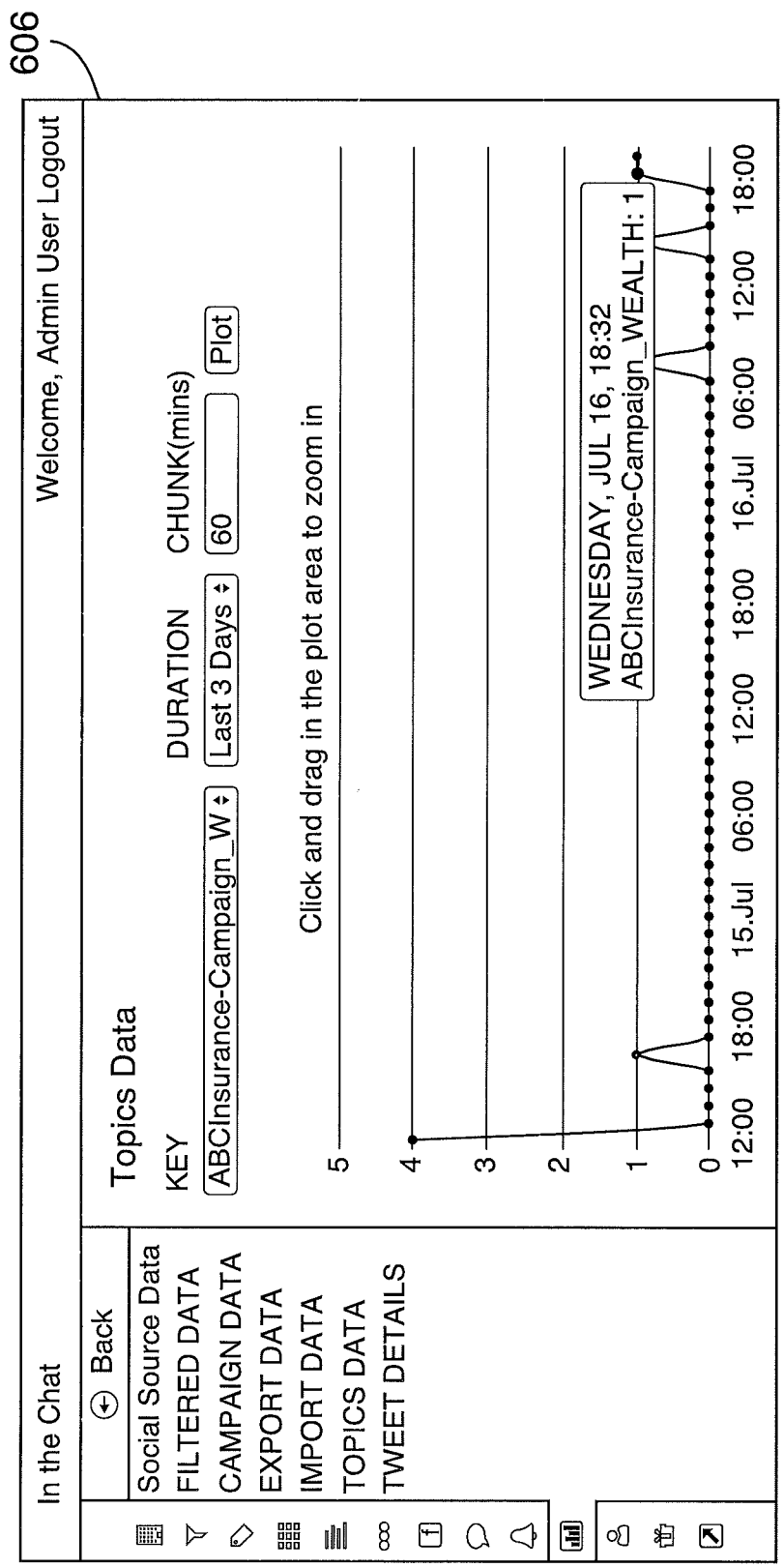

FIG. 6d shows a screen (606) of the management portal allowing a user to view data relating to flow rates of social media objects through the system. In particular screen (606) shows flow metrics for a particular topic of a particular campaign. As shown, the flow metrics may be graphed over time. Similar screens may be provided to show the flow rate of objects for a particular campaign (including multiple topics), the flow rate of objects through particular filters, or from particular sources (e.g., particular networks or aggregators). Based on this information, a user may, for example, allocate campaign personnel, refine rules for including/excluding social media objects, refine filter parameters, etc.

In one aspect of the invention the platform provides a unified set of tools for managing marketing communications that addresses the social web.

In another aspect, the CRM (30) may be connected to a dashboard (such as the dashboard shown in FIG. 5f). The workflow manager (24) creates a series of queues with actionable tickets. In one aspect, the workflow manager (24) includes a decision tree for apportioning tickets amongst campaign personnel. The workflow manager (24) may include matching functions for matching personnel attributes to ticket attributes so as to assign tickets to personnel who may well positioned to act on the ticket. The CRM (30) dashboard, in one implementation, displays the tickets and permits the campaign personnel to reject tickets that are not relevant to the campaign.

In another aspect of the present invention, the CRM (30) categorizes tickets into channels (streams), and permits campaign personnel to pick channels of their choice. This is based on the fact that campaign personnel tends to perform better if they can select a channel that they prefer based on their knowledge or interest. An example of this functionality for selecting channels is shown in FIG. 5c. As shown, channels (streams) may be selected by drag-and-drop into particular queues.

In another aspect of the invention, the CRM (30) dashboard displays information regarding the social media objects in the queue that permits the campaign personnel to accept or reject the ticket as being relevant to the campaign. Various types of queues are possible. For example, customer service, sales, retention, technical support, or brand management queues. In particular verticals, for example "banking" there may be separate queues for credit, personal banking, investment services, insurance, etc.

The platform (8) can deliver for example to an agent or campaign personnel dashboard: (A) actionable sales leads; (B) requests for service support; or (C) brand management opportunities. One function of the sales & service portal is for example relevant social media posts are sent to the right parties (such as specific campaign personnel). The sales and service portal may also include features that allow campaign personnel to capture notes within the conversation threads. The platform (8) presents customizable fields that allows the presentation of information that matters to a particular client/workflow. Because content is downloadable in the platform (8), insights generated by the platform can be integrated into social and traditional customer insights.

In one aspect of the invention, platform (8) includes a communication utility (32). The communication utility (32) allows campaign personnel to target customers in the same social networking platform (10) in which the relevant social media interaction occurred. The communication utility (32) also allows conventional communications to be initiated within the queue of relevant social media objects presented through a dashboard. The platform (8) may include or link to a variety of communication features. For example, the platform (8) may include (i) Internet chat features; (ii) automatic reply to social media objects using their associated social media platform; (iii) switch to call, switch to chat and so on.

In one aspect of the invention, the present invention provides a special two-level filtering process that improves, using at each level different filtering tools/techniques, which in relation to social media objects provides an efficient, scalable and cost effective solutions for targeting customers through the social web in real time or near real time.

Prior art solutions consist generally of listening platforms that were purely keyword based, and are generally based on a one step approach. Listening profiles were defined based on key words and these would be applied to social media object pipelines in order to identify social media objects of interest. This approach tends to miss social media objects that may be of interest by filtering out social media objects that do not map to the key words, and yet are relevant for the purposes of one or more campaigns. And once these prior art solutions deem a social media object to be of interest, the filtering techniques are not robust enough to streamline or automate actions on such social media objects, as further explained below.

The present invention on the other hand greater granularity in categorization of social media objects. One aspect of the granularity is the ability to map social media objects to specific campaign items.

Categorizing

As previously stated, for ease of use social media objects are categorized by using one or more classifiers to process the social media data in a relevant repositories.

Additional details are now provided regarding possible filtering functionality for use in connection with the second stage of the extraction/filtering of social media objects, as previously described.

In another aspect of the invention, the extractor/filter system (12) implements one or more text mining techniques or algorithms that incorporate learning technology elements. In one aspect, the text mining techniques used include linguistic analysis and statistical analysis elements that provide very good relevance.

In one implementation, the text mining techniques are first trained by humans for a particular campaign or class of campaigns. For example, personnel of the operator of the platform for example may review information regarding a brand, and then social media data that may be related to the brand, in order to discover associations that may assist in filtering social media objects relevant to the brand. For example, "BELL" may be a brand associated with a client. The personnel of the operator of the platform (8) may learn the context of Internet posts that are relevant to "BELL" and those that are not. This information may be used to train the text analysis algorithms.

Various other filtering techniques may be used to further improve the targeting of consumers. The database (26) may include for example information regarding priority customers, and the platform (8) may be used to manage campaigns targeting priority customers.

In one aspect, the extractor/filter system (12) replicates human interpretation/categorization of social media content by applying text analysis and statistical analysis. In one aspect, the purpose of the text analysis is to categorize social media objects into one or more discrete topic relevant to a campaign. One example is a brand name such as "VIRGIN", where the platform find all posts relevant to "VIRGIN", "VIRGIN" related posts being a category. As explained below, one or more classifiers are used to classify the social media objects and thereby organize them into one or more categories. These classifiers are first trained, for example based on attributes of a campaign, and how to differentiate between posts actually related to the "VIRGIN" brand. In one example, it was found that the platform (8) is around 96% accurate.

In another aspect the platform (8) uses one or more statistical methods to calculate a confidence rating that a post for example relates to a particular category.

In one aspect, the extractor/filter system (12) executes one or more routines that receive as input a set of labelled data points, and using one or more suitable classifiers (which may be implemented as classification algorithms), labels previously un-seen data points into one of a plurality of classes. This allows the construction of a model that can be used to a qualify a new observation as a member of a particular class.

Various supervised learning algorithms exist that may be used for classification. Different algorithms have different properties and characteristics in terms of accuracy, training time, amount and type of data needed for learning, efficiency in re-training based on additional data and ability to fix mistakes.

In one aspect, the extractor/filter system (12) includes a library of algorithms, and the operator of the platform (8) may test different algorithms selections with data sets to select one or more optimal algorithms, and the algorithms that provide an advantageous result may be saved to a profile associated for example with a campaign or template.

A number of classification algorithms or classifiers may be suitable including for example the following: Naive Bayes, Support Vector Machines (SVM), Max Entropy, Generalized Linear Models (GLM), Logistic Regression, Decision Tree, Random Forest, and Probabilistic Graphical Models. Such algorithms/classifiers may be used alone, or in combination. Other algorithms/classifiers apparent to those of ordinary skill in the art may also be used. In one example implementation using a Probabilistic Graphical Model, the model includes Sum-Products Networks, as described in "Sum-Product Networks: A New Deep Architecture", Poon, H. and Domingos, P. in: Proceedings of the 27th conference on Uncertainty in Artificial Intelligence (UAI 2011), the contents of which are hereby incorporated by reference in their entirety. As will be appreciated, including Sum-Product Networks may improve classification speed.

In another aspect of the invention, another aspect of testing the algorithms is nullifying the effect of a certain algorithm achieving a positive result on a particular data set by chance. This can be achieved using a process known as cross-validation, which may be carried out by using a subset of the data to train the algorithm, and then evaluate it on the held-out sample which was not used in training. This process may be repeated multiple times and then the results may be averaged. Use of cross-validation for training the classifiers ensures that the results are statistically significant and that the classifiers are resistant to any bias from a particular training data set.

Another aspect of evaluating the accuracy of an algorithm for a particular data set, or data set type, is parameter tuning. Different algorithms have different parameters that can be compared to tuning knobs. The output (accuracy) of the algorithms varies based on how these parameters have been set. The parameters may be set empirically by trying different values and using values which yield the best result. In one aspect of the system, parameter tuning is used to ensure that the best parameters for each algorithm are determined and the best accuracy is available.

Often in practice, the combination of several algorithms results in better results than any single algorithm. This is because different algorithms are better suited for different aspects and using them in conjunction can allow benefiting from their strengths. This process is known as ensemble learning. The key in ensemble learning is to combine algorithms such that their combination increases the accuracy rather than decreasing it. In another possible aspect of the platform, algorithms may be combined thereby applying ensemble learning.

While cross-validation and parameter tuning can help in determining the best individual classifiers, they may not be the best combination overall. Some sub-optimal individual classifiers can provide better results when used in conjunction with one another.

In one aspect, an alternating optimization algorithm may be implemented that provides a heuristic to perform the task of alternating the algorithms. The process may start by first individually tuning the parameters for each algorithm. Next, the parameter tuning process for the first algorithm may be initiated, but at this point the parameters are tuned to get the best overall result, assuming the parameters of the other algorithms have already been fixed. Once, the best setting for this algorithm is available, this setting may be logged. The parameter tuning may then be repeated for the next algorithm. This process may be repeated in a loop till convergence is achieved or otherwise a certain time quota has been exhausted and the best setting of parameters is achieved within the allotted time.

Classification algorithms build models to quantify by using a set of features. A feature can be any variable that provides some information that can contribute to the classification process. A classification algorithm observes a labelled data point, provided for training purposes, by examining the values for all the features on that data point and then using this information to develop a model for future classification. If the features do not provide discriminative information between the classes, the classification algorithm cannot provide good accuracy.

In certain problems, features are naturally available and can be used as input to classification algorithms. In other domains, it may be necessary to devise features that experts would consider as discriminative to assist the classification algorithm in making the correct choice. For text classification, features can be words, phrases, synonyms, or some other logical concepts (such as names of competitors of a company, description of a price, other concepts relevant to a domain etc), or otherwise any linguistic patterns. Linguistic information such as part-of-speech tagging provides help in disambiguating word sense when multiple meanings are possible for the same word.

In one aspect, dictionary entries as well as features generated by domain experts may be used as a set of features that may be used as input to the classification algorithm.

In another aspect, the classification algorithm may be adapted to process features for a variety of languages and/or alphabets. In this way, social media objects having text in such languages and/or alphabets may be classified into appropriate categories. In some embodiments, social media objects stored in repositories may be separated by language/alphabet. In other embodiments social media objects in different languages/alphabets but having related content may be stored in the same repository. Channels/streams may be defined based on language/alphabet, and appropriate campaign personnel may be assigned to particular channels/streams based on language/alphabet.

If a lot of features are available, the classification algorithm may not be able to scale. This problem may present in text classification because each and every word can be considered as a feature. In such cases, it may be necessary to retain features that are actually discriminative, and to discard features that do not provide any information that is helpful to the classification process. In this case, feature selection techniques may be used to evaluate individual features and then the best subset of features is retained as input to the classification algorithm.

In one aspect of the invention, the following techniques may be used for feature selection: mutual information, information gain, Gini impurity, odds ratio and Chi-squared techniques for feature selection.

If the results of a classification algorithm are considered to be inadequate, more training data or more features may be required. This trade-off is generalized and referred to as the bias-variance trade-off. If the same classification algorithm with the same set of features has different accuracy using different sample training data in the cross-validation process, it is known to have a high variance. To reduce the variance, either more data needs to be added or some features need to be removed. On the other hand, if the classification algorithm consistently makes mistakes even on the previously seen training sample, it is known to have a high bias. This typically means that the features currently being used by the algorithm are not adequate and more features need to be provided to the algorithm. More training data in this case will not be helpful. Generally, there exists a trade-off between bias and variance. It may not be possible to achieve good results for both bias and variance. These concepts may be used to determine next steps (obtain more features or training data) to improve the algorithm.

The following provides an example of classification:
1. The classes from which the classification algorithm shall choose from are selected.
2. Sample data is labelled using the classes.
3. Domain experts create discriminative features for the classes.
4. Various machine learning algorithms are tested using the identified features and labelled data.
   a. Results are evaluated using cross-validation.
   b. Parameter tuning is performed for each algorithm.
6. The accuracy of individual classifiers is determined, and it is decided if ensemble learning is needed.
6. Optionally, if ensemble learning is needed,
   a. Results are evaluated from combination of algorithms; and
   b. Alternating optimization is performed to refine parameters for ensemble.
7. Optionally, use concepts of bias and variance to determine whether:
   a. More training data is needed,
   b. More features are needed, or
   c. Best accuracy has been achieved using algorithms in consideration.

The feature generation processes may be performed once for a single domain and then reused among other clients. For each new client in that domain, features specific to that named entity (client) would still be needed. This is because the name of this client may not otherwise have any relation to the specific domain under consideration, and thus any relations of that client's name to unrelated concepts and objects would have to be removed by use of new features that allow the algorithm to filter them out.

In yet another aspect of the invention, feedback relating to classification accuracy is used to continuously tune a classification algorithm. In particular, algorithm results are sampled, and then reviewed and graded. Reviewing and grading may be performed by a human operator. The sampled results and results of the associated reviewing/grading are provided as feedback to the algorithm's model. The model parameters may then be updated based on the feedback. For example, the confidence level in the inference of any given algorithm feature may be may be updated. In this way, an algorithm's model may change over time, e.g., updated in real time based on automatic machine learning from the feedback. Conveniently, in this way classification algorithms may be continuously tuned to track normal shift and drift in language usage. For example, the algorithms may keep in step with the emergence of new terms, phrases, memes, hashtags, etc., as is common place in social media.

Possible Intelligent Features

In another aspect, the platform (8) includes an analytics engine (34).

In one aspect, the analytics engine (34) links to client data in order to generate a variety of customer insights. In one aspect, the analytics engine (34) calculates the likelihood that a particular customer will engage in an activity of interest such as sign up with Mobile Carrier A or move from Mobile Carrier A to Mobile Carrier B.

In one aspect, the platform (8) generates a list of "at risk customers" an presents relevant information for engaging with these customers through the platform (8).

Figure 7B:
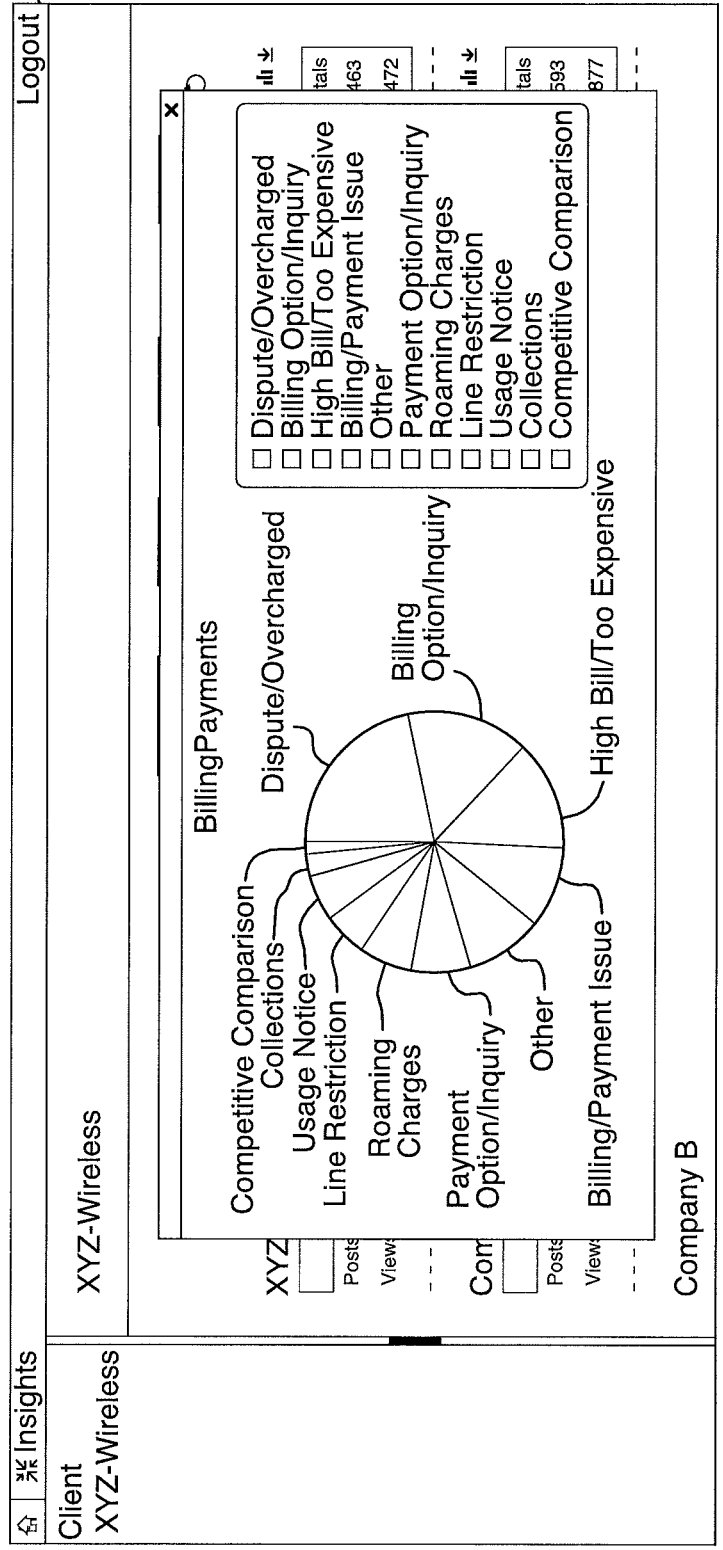

In another aspect, the web application provides an insights portal (36) that provides categorized, quantified, and clickable insights regarding what customers are saying regarding clients and their competitors, in regards to active campaigns. The insights portal (36) may permit users to view data at multiple levels, from aggregate to individual posts; drill into topics, time frames, trends and post types; and shows the number of views. As best shown in FIGS. 7*a*, 7*b*, and 7*c*, a possible embodiment of the insights portal (36) is shown. Each of the screens of the insights portal (36) may be presented to users operating end-user devices (4) in the form of one or more webpages.

In particular, FIG. 7*a* shows a screen (700) that provides a summary view of the number of social media objects (e.g., posts), broken down by company and by topic (e.g., pricing, hardware, customer service, sales, etc.) Meanwhile, FIG. 7*b* shows a screen (702) that provides a pie chart showing the relative proportion of objects by topic, overlaid on the view provided by screen (700). Of course, such forms for presenting data are exemplary only, and other types of tables, charts, graphs, graphics, etc., may also be used. FIG. 7*c* shows a screen (704) that provides a window containing a drilled down view of a particular set of social media objects, overlaid on the view provided by screen (700).

In another aspect, the platform incorporates analytics tools that discover marketing communication trends. In one possible implementation: the platform suggests possible action items for improving marketing communications by presenting recommended actions to the management portal.

It should be understood that the business systems may also include remote, third party data sources such as for example LinkedIn™, Twitter™ and others, wherein a workflow implemented by operation of the present invention may include a step of automatically retrieving relevant information from such external sources upon for example a user completing an associated workflow step.

Also, the business or technology environment that produces the need for adoption of new workflows or updates to existing workflows can be very fluid. For example, in a sales environment new insights are developed all the time regarding workflows that are effective in driving sales. Similarly, the sales environment is fluid and therefore the desired best practices for sales personnel are subject to change. Also, sales techniques need to reflect that what works for one sales person may not work for another. The changing composition of sales staff and because of this the evolving cultural, demographic, social, and personality traits of the sales staff as a whole, also requires adjustment of sales strategies and how these are applied in specific instances. All of these factors are examples of what contributes to a changing environment. To develop and update workflows that keep up with these changes is often impractical. The present invention solves this significant problem.

The system of the present invention may also include an analytics engine (34) that is operable analyze data related to sales activities and apply analytics for example to define trends, suggest best practices, identify insights or trends, identify in real time top sales persons, determine sales strategies that work best for certain products or certain types of customers. Once these patterns are identified, these can be integrated in sales activity monitoring enabled by the present invention, for example a salesperson may be sent one or more notifications designed to alert the salesperson if they are diverging from a pattern that has been established as being optimal in certain circumstances. For example, the analytics engine (34) may analyze a target based on his/her social media interactions and automatically suggest a tone or approach to engaging the target through social media such as "APOLOGETIC", "LIGHT", "OFFER INCENTIVE" and so on.

The analytics engine (34) may implement various analytics applications and/or analytical processes. The analytics engine (34) may include a semantic analyzer for example for analyzing semantically for example text captured from various communications that are part of the social media interactions initiated using the social networking environment of the present invention. Access to the analytics engine (34) may be controlled and managed by operation of the management utility (18).

The analytics engine (34) may enable an administrator for example to construct and obtain answers to various queries, or initiate the generation of various reports based on data output from the analytics engine (34).

The platform (8), including based on operation of the analytics engine (34) may provide business intelligence that can be segmented by local, regional, national and internationally.

The analytics engine (34) may incorporate or be linked to sentiment analysis functions or features so as to monitor the mood of the sellers in terms of how they are feeling about the products or services of the enterprise.

The computer system of the present invention may be configured to implement various intelligent features. These intelligent features may utilize the analytics engine (34). Examples of such intelligent features are provided below.

(A) Social media interactions with targets may be analyzed to determine various parameters that may be relevant to approaching the target in an effective manner. For example the computer system may determine the best mode of communication with a prospective target customer or customer perhaps by analyzing bursts of activity or inactivity.

(B) The computer system may determine for example the current mood of a sales prospect, for example by applying sentiment analysis to postings of a sales prospect captured from their social media feeds.

(C) The computer system may develop over time a personality file, demographic profile, or psychographic profile for a sales prospect, which may be used by the computer system in various workflows. The computer system may utilize for example learned, observed, and/or evaluated personality traits.

(D) The computer system may utilize the various intelligent features described above for example to dynamically suggest targeting. A system generated notification may also for example suggest a specific product or service that a prospect is most likely to be interested in, including at a particular time. The computer system may also for example iteratively match a sales prospect with a particular sales agent to exploit for example a personality match. A variety of different user interfaces may be used to present this information, such as for example "hot buttons".

(E) The computer system may analyze various available data sources. For example, the computer system may link to one or more social media platforms in order to extract information concerning users who have "LIKED" particular products, content, or services, but also the content associated with the social media interactions of a target, to provide deeper analysis of the preferences or interests of a target. This information may be used for example to suggest a particular offer or incentive for marketing to the target.

(F) The analytics engine (34) may also apply one or more operations for generating insights based on extracted information. These may include semantic operations (for example analysis of an article that a target has read), weighting of content, fuzzy logic operations, artificial intelligence, and so on. Also, the platform may enable: site behavior profiling (e.g. click path analysis, purchase patterns analysis); collaborative filtering ("people who have behaved like you were more likely to perform some specified activity"); and keyword search of content.

The resulting automatically generated information may also be matched with information from other associated sales tools such as sales records, notes, opportunity stages.

The overall platform architecture and associated resources enable these new and innovative processes.

Example Workflow

Figure 8:
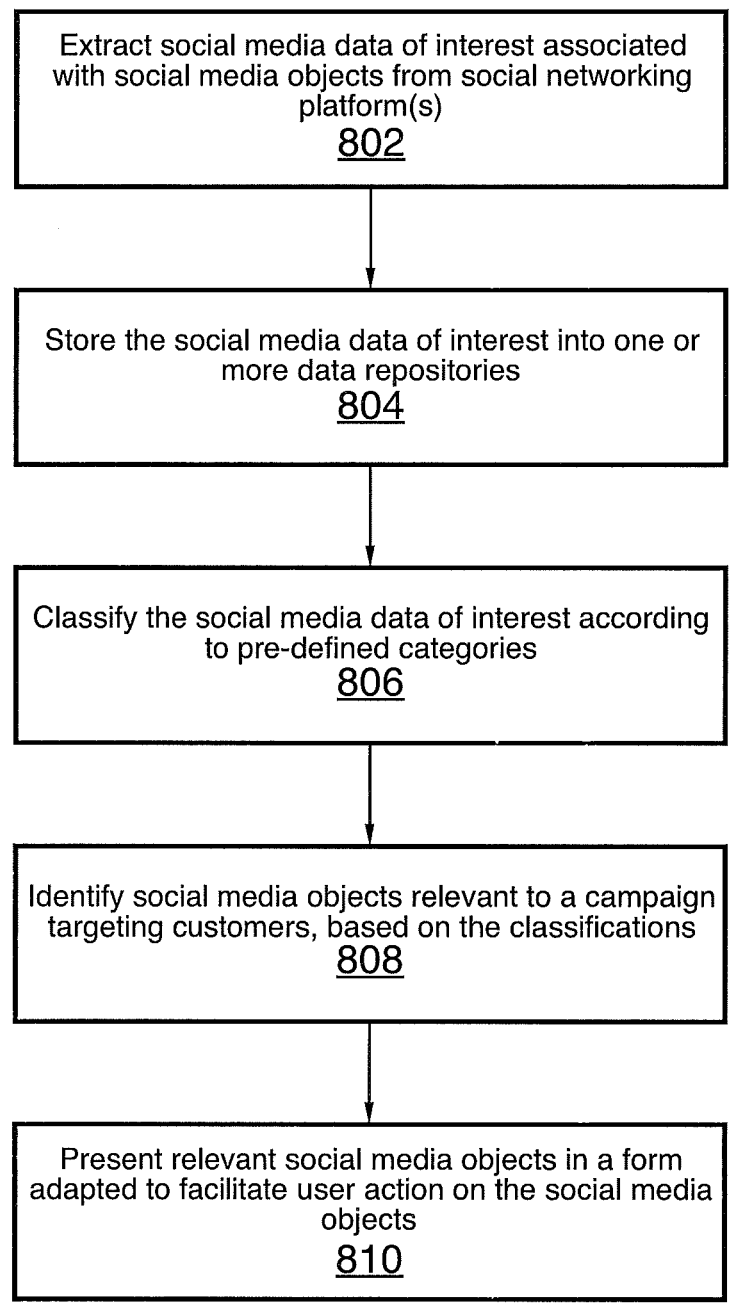
FIG. 8 is a flowchart showing an exemplary workflow of the platform of FIG. 1.

The operation of platform (8) is further described with reference to the example workflow depicted in the flowchart of FIG. 8.

In particular, at block 802, social media data of interest are extracted by the extractor/filter 12 from social media objects from one or more social media networks or aggregators, i.e., platforms (10). At this stage, social media data may be extracted based on a low relevance threshold. At block 804, the social media data of interest is stored into one or more data repositories (16). At block 806, one or more classifying techniques are applied by the extractor/filter (12) to classify the social media data of interest according to pre-defined categories. At block S808, the extractor/filter (12) identifies the social media objects relevant to an active campaign, based on the classifications. At block 810, the platform (18) presents one or more of the identified social media objects to a user in a form adapted to facilitate user action on the presented social media objects (see FIG. 5f).

Examples in Operation

In one example, a telecom client's customers were coaching one another on how to get less expensive deals by placing multiple calls into the call centre. The issue resulted from the high variability of offers that would be made by the client's customer retention agents.

The insights portal (36) can deliver a number of insights to clients such as the number of social media posts on the topic to measure engagement, the number of views of each post to gauge impact, and verbatim insights into the number of calls that needed to be placed to achieve a better deal, which acted as guidance to the market.

It is well known that calls to a call centre are relatively expensive, and can cost around $7 per call. The management of engagement with customers and potential customers allows standardization among campaign personnel and identifying gaps in training.

In another example, a carrier learned through the platform (8) that the social web was viewing the carrier's offer of only one type of mobile device negatively, and therefore customers were purchasing from a competitor. A business decision was made to offer multiple versions, thereby capturing and optimizing sales that would otherwise have gone to competitors.

If customers say something positive about a brand, the positive brand impression can be reinforced with a simple, timely "thank you" or by providing an incentive.

A TV cable provider wanted to increase their customer base and generate increased revenues. The platform (8) identified new opportunities for the client, and allowed them to more effectively use social media in order to sell services to consumers interested in the clients' solutions, motivate consumers to consider a new provider, and/or express intent to leave a competitor.

Another client had received a downgrade from a major credit rating agency, which was garnering unwelcome attention in both traditional and social media. The client was unsure about the best response to the situation. The client used the platform (8) to in real time gauge public response, and evolution of public response, and take steps to mitigate reputational damage.

System Implementations

Various other computer system implementations are possible. Various client/server, mobile, and cloud computing implementations are possible.

"Cloud computing" includes Internet based computing where shared resources, software and data are provided on demand. A "cloud" therefore can refer to a collection of resources (e.g., hardware, data and/or software) provided and maintained by an off-site party (e.g. third party), wherein the collection of resources can be accessed by an identified user over a network. The resources can include data storage services, word processing services, and many other general purpose computation (e.g., execution of arbitrary code) and information technological services that are conventionally associated with personal computers or local servers.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In general, the concepts of "virtual" and "cloud computing" include the utilization of a set of shared computing resources (e.g. servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

While the present innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer (such as the computer(s) illustrated in the architecture described above) typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system of the present invention represents a collection of hardware and software elements that enable a user to manage a variety of device and information objects associated or generated by these devices, leveraging in-the-cloud resources in a new way.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be understood that the present invention may be extended by linking the invention with other technologies or processes useful in the monitoring, control or management of a variety of devices, for a variety of purposes.

The invention claimed is:

1. A system for targeting customers through social networks, the system comprising:
 at least one processor;
 a network interface; and
 non-transitory computer-readable memory in communication with the at least one processor, the memory storing processor-executable instructions;
 the at least one processor, when executing the processor-executable instructions, causes the system to:
  extract social media data of interest associated with a plurality of social media objects from at least one social networking platform, by way of the network interface;
  analyze the social media data of interest to calculate a likelihood that a customer will engage in a pre-defined activity of interest;
  store the social media data of interest in a data repository;
  classify the social media data of interest according to pre-defined categories;
  based on the classifying, identify a subset of the plurality of social media objects relevant to a campaign targeting customers; and
  present, to a user, at least one social media object of the subset of social media objects in a form adapted to facilitate user action on the at least one social media object.

2. The system of claim 1, wherein the plurality of social media objects comprises posts by customers to the at least one social networking platform.

3. The system of claim 1, wherein the extracting the social media data of interest comprises selecting the plurality of social media objects from amongst available social media objects.

4. The system of claim 3, wherein the selecting the plurality of social media objects comprises matching social media objects to at least one pre-defined keyword, user identifier, or source identifier.

5. The system of claim 1, wherein the classifying the social media data comprises applying semantic text analysis to the social media data.

6. The system of claim 1, wherein the classifying the social media data comprises processing the social media data using at least one classifier.

7. The system of claim 6, wherein the classifying the social media data comprises training the at least one classifier.

8. The system of claim 6, wherein the training the at least one classifier comprises providing feedback relating to classification accuracy to the at least one classifier.

9. The system of claim 6, wherein the at least one classifier comprises at least one of a Naive Bayes, a Support Vector Machine, a Max Entropy, a Generalized Linear Model, a Logistic Regression, a Decision Tree, a Random Forest classifier, and a Probabilistic Graphical Model.

10. The system of claim 1, wherein the identifying the subset of social media objects comprises identifying the social media objects of the plurality of social media objects classified into categories defined to be associated with the campaign.

11. The system of claim 1, wherein the pre-defined categories comprise categories relating to a particular company.

12. The system of claim 11, wherein the pre-defined categories comprise categories relating to particular competitors of the particular company.

13. The system of claim 1, wherein the user action comprises generation of a social media object responsive to the at least one social media object.

14. A computer-implemented method of targeting customers through social networks, the method comprising:
 extracting social media data of interest associated with a plurality of social media objects from at least one social networking platform;
 analyzing the social media data of interest to calculate a likelihood that a customer will engage in a pre-defined activity of interest;
 storing the social media data of interest;
 classifying the social media data of interest according to pre-defined categories;
 based on the classifying, identifying a subset of the plurality of social media objects relevant to a campaign targeting customers; and
 presenting, to a user, at least one social media object of the subset of social media objects in a form adapted to facilitate user action on the at least one social media object.

15. The method of claim 14, further comprising:
measuring a rate at which social media data of interest are extracted from the at least one social networking platform.

16. The method of claim 14, wherein the extracting the social media data comprises receiving the social media data by way of a network.

17. The method of claim 14, further comprising:
submitting, to a social networking platform, a social media object responsive to the at least one social media object.

18. The method of claim 14, wherein the social media objects comprise posts by customers to the at least one social networking platform.

19. The method of claim 14, wherein extracting the social media data of interest comprises selecting the plurality of social media objects from amongst available social media objects.

20. The method of claim 19, wherein the selecting the plurality of social media objects comprises matching social media objects to at least one pre-defined keyword, user identifier, or source identifier.

21. The method of claim 14, wherein the classifying the social media data comprises applying semantic text analysis to the social media data.

22. The method of claim 14, wherein the classifying the social media data comprises processing the social media data using at least one classifier.

23. A system for targeting customers through social networks, the system comprising:
at least one processor;
a network interface; and
non-transitory computer-readable memory in communication with the at least one processor, the memory storing processor-executable instructions;
the at least one processor, when executing the processor-executable instructions, causes the system to:
extract social media data of interest associated with a plurality of social media objects from at least one social networking platform, by way of the network interface;
measure a rate at which social media data of interest are extracted from the at least one social networking platform;
store the social media data of interest in a data repository;
classify the social media data of interest according to pre-defined categories;
based on the classifying, identify a subset of the plurality of social media objects relevant to a campaign targeting customers; and
present, to a user, at least one social media object of the subset of social media objects in a form adapted to facilitate user action on the at least one social media object.

24. A computer-implemented method of targeting customers through social networks, the method comprising:
extracting social media data of interest associated with a plurality of social media objects from at least one social networking platform;
measuring a rate at which social media data of interest are extracted from the at least one social networking platform;
storing the social media data of interest;
classifying the social media data of interest according to pre-defined categories;
based on the classifying, identifying a subset of the plurality of social media objects relevant to a campaign targeting customers; and
presenting, to a user, at least one social media object of the subset of social media objects in a form adapted to facilitate user action on the at least one social media object.

* * * * *